US012797800B2

(12) United States Patent
Nakamoto

(10) Patent No.: US 12,797,800 B2
(45) Date of Patent: Nov. 17, 2026

(54) HOLLOW FIBER MEMBRANE MODULE AND A MANUFACTURING METHOD OF THE SAME

(71) Applicant: ASAHI KASEI KABUSHIKI KAISHA, Tokyo (JP)

(72) Inventor: Kohei Nakamoto, Tokyo (JP)

(73) Assignee: ASAHI KASEI KABUSHIKI KAISHA, Tokyo (JP)

(*) Notice: Subject to any disclaimer, the term of this patent is extended or adjusted under 35 U.S.C. 154(b) by 489 days.

(21) Appl. No.: 18/349,961

(22) Filed: Jul. 11, 2023

(65) Prior Publication Data

US 2024/0009624 A1 Jan. 11, 2024

(30) Foreign Application Priority Data

Jul. 11, 2022 (JP) ................................ 2022-111426

(51) Int. Cl.
*B01D 63/04* (2006.01)
*B01D 63/02* (2006.01)
*B01D 65/02* (2006.01)

(52) U.S. Cl.
CPC ......... *B01D 63/04* (2013.01); *B01D 63/0233* (2022.08); *B01D 65/02* (2013.01); *B01D 2321/04* (2013.01)

(58) Field of Classification Search
CPC .... B01D 63/04; B01D 63/0233; B01D 65/02; B01D 2321/04; B01D 2313/04; B01D 63/021; B01D 63/02
See application file for complete search history.

(56) References Cited

U.S. PATENT DOCUMENTS

| | | | |
|---|---|---|---|
| 2013/0001174 A1 | 1/2013 | Zacharias et al. | |
| 2016/0310906 A1 | 10/2016 | Fukada | |
| 2020/0246754 A1 | 8/2020 | Kobayashi et al. | |

FOREIGN PATENT DOCUMENTS

| | | | | | |
|---|---|---|---|---|---|
| CN | 105745011 | A | | 7/2016 | |
| CN | 108117133 | A | | 6/2018 | |
| JP | S63248407 | A | | 10/1988 | |
| JP | H02227129 | A | | 9/1990 | |
| JP | H04317724 | A | | 11/1992 | |
| JP | H06246138 | A | | 9/1994 | |
| JP | 2005230046 | A | | 9/2005 | |
| JP | 2010022935 | A | | 2/2010 | |
| JP | 2018089614 | A | * | 6/2018 | |
| JP | 2022074103 | A | | 5/2022 | |
| WO | WO-2015099015 | A1 | * | 7/2015 | ........... B01D 65/022 |
| WO | 2018143250 | A1 | | 8/2018 | |

OTHER PUBLICATIONS

Www.nitto.com, Retrieved on Sep. 9, 2026, from URL: https://www.nitto.com/jp/ja/products/membrane/about/capillary_module/.

* cited by examiner

*Primary Examiner* — Waqaas Ali
(74) *Attorney, Agent, or Firm* — KENJA IP LAW PC

(57) ABSTRACT

Sterilization is achieved while the filtration performance of membranes is maintained. In a hollow fiber membrane module 1, a hollow fiber membrane bundle 3 is accommodated in a module case 5. In the hollow fiber membrane module 1, both ends of the hollow fiber membrane bundle 3 are integrated with the module case 5 by a potting material. A storage liquid is contained in 90% or more of the pores of the hollow fiber membrane bundle 3. Space inside the module case 5 is filled with a gas free of viable bacteria and the storage liquid.

17 Claims, 10 Drawing Sheets

HOLLOW FIBER MEMBRANE MODULE AND A MANUFACTURING METHOD OF THE SAME

This application claims priority from Japanese Patent Application No. 2022-111426 filed in Japan on Jul. 11, 2022, and the entire disclosure of this application is hereby incorporated by reference.

TECHNICAL FIELD

The present disclosure relates to a hollow fiber membrane module suitable for use in the filtration process of culture or fermentation solutions to remove turbid components in water to be treated, for concentration and purification of target substances, or as a filter for ultra-pure water production, and a manufacturing method of the same.

BACKGROUND

When hollow fiber membranes are used in the process of manufacturing peptide drugs, protein drugs, antibody drugs, and the like, utilizing *E. coli*, yeast, and animal cells, the batch culture method, in which unneeded components in the culture medium are removed by filtration after the culture is completed, and the continuous culture method, in which target substances are collected as needed during the culture, are used as appropriate. It is desired that these products be pre-sterilized and provided ready for use by the user with only minimal cleaning.

In order to suppress microbial growth in the product while maintaining filtration performance during storage, a glycerin solution, an alcohol solution, or a sodium hypochlorite solution has been used in typical hollow fiber membrane modules. In recent years, membrane modules filled with sterilized water are used for the purpose of reducing wastewater treatment of such storage liquids (see, for example, PTLs 1 and 2).

CITATION LIST

Patent Literature

PTL 1: JP2018089614A
PTL 2: WO 2015/099015

SUMMARY

Since the inside of the membrane module is filled with pure water in PTL 1, it is necessary to provide a mechanism to mitigate the pressure increase that occurs during the thermal treatment. In addition, since the inside of the membrane module is also filled with water in PTL 2, it is necessary to provide a mechanism to prevent the pressure from rising during the thermal treatment, and it is also necessary to dispose a closure member to prevent expanded water from coming into direct contact with aseptic connection members connected to the membrane module.

An object of the present disclosure is to solve the above problem and to provide a hollow fiber membrane module that can maintain filtration performance while preventing dryness of the hollow fiber membranes and can maintain asepticity inside a hollow fiber membrane module for a long period of time, and a manufacturing method of the same.

The present inventors have conducted intensive research and verification to satisfy the wide variety of requirements as described above. As a result, it was discovered that all requirements could be satisfied by sealing water and gas that have been sterilized in a certain ratio inside a hollow fiber membrane module, which led to the present disclosure. Specifically, the present disclosure is as follows:

[1]

A hollow fiber membrane module comprising:

a hollow fiber membrane accommodated in a module case, the hollow fiber being a plurality of hollow fiber membranes bundled together, both end faces of the hollow fiber membrane bundle being integrated with the module case by a potting material, wherein a storage liquid is contained in 90% or more of pores of the hollow fiber membrane bundle, the storage liquid being water free of viable bacteria, a space portion inside the module case is filled with a gas free of viable bacteria and the storage liquid.

[2]

The hollow fiber membrane module according to [1], wherein when a piping connection port present in the module case is sealed by a sealing member, the following expression (1) is satisfied:

$$0.35 \leq W_{all}/V_{all} \leq 0.95 \quad (1)$$

where $V_{first}$ is a volume of a first space surrounded by an inner surface of a cap attached to the module case, an end face of the potting material, and inner surfaces and end faces at both ends of the hollow fiber membranes, $V_{second}$ is a volume of a second space surrounded by an inner surface of the module case, the end face of the potting material, and outer surfaces of the hollow fiber membranes, $V_{pore}$ is a volume of a third space formed by the pores of the hollow fiber membranes, $V_{all}$ is a total volume of $V_{first}$, $V_{second}$, and $V_{pore}$, $W_{first}$ is a volume of the storage liquid present in the first space, $W_{second}$ is a volume of the storage liquid present in the second space, $W_{pore}$ is a total volume of the storage liquid present in the third space, and $W_{all}$ is a total volume of $W_{first}$, $W_{second}$, and $W_{pore}$.

[3]

The hollow fiber membrane module according to [1] or [2], wherein a ratio of $W_{first}$ to $V_{first}$ is equal to or less than a ratio of $W_{second}$ to $V_{second}$.

[4]

The hollow fiber membrane module according to any one of [1] to [3], wherein the ratio of $W_{second}$ to $V_{second}$ is 0.8 or more and 1 or less.

[5]

The hollow fiber membrane module according to any one of [1] to [4], further comprising a pair of fixation portions made of a potting material that seals space between the outer surfaces of the hollow fiber membranes and between the outer surfaces and the inner surface of the tubular case at both ends of the hollow fiber membrane bundle inside the module case, and a pair of flow guide cylinders that are provided closer to a longitudinal center side of the module case than the pair of fixation portions, and are disposed so as to surround respective ends of the hollow fiber membrane bundle, wherein a separation distance between one ends of the flow guide cylinders located on fixation portion sides and the fixation portions is 1 mm or more and 20 mm or less.

[6]

The hollow fiber membrane module according to any one of [1] to [5], wherein

TOC in the storage liquid contained in the module case is 1 ppm or more and 50 ppm or less.

[7]

The hollow fiber membrane module according to any one of [1] to [6], wherein all piping connection ports provided to the module case are sealed by blind caps, a linear expansion coefficient of a material used for the blind caps is between 0.95 and 1.05 times a linear expansion coefficient of the module case.

[8]

The hollow fiber membrane module according to [1], wrapped by a wrapping film having a first portion, at least part of which has gas permeability.

[9]

The hollow fiber membrane module according to [8], wherein the module case is cylindrical, and at least a part of the piping connection port provided to the module case protrudes in a direction perpendicular to a longitudinal direction of the module case, the hollow fiber membrane module is wrapped by the wrapping film so that a second portion of the wrapping film, which has a smaller gas permeability than the first portion, is positioned within a range of 120° centered around a direction rotated by 90° relative to a direction of protrusion of the port or within a range of 60° centered around an opposite direction of the direction of protrusion, in a radial direction of an axis of the module case.

[10]

The hollow fiber membrane module according to any one of [1] to [9], wherein an aseptic connector is attached to the piping connection port provided to the module case, the aseptic connector comprises a sterile filter, and one end face of the sterile filter is in direct contact with a space inside the hollow fiber membrane module.

[11]

A manufacturing method of a hollow fiber membrane module comprising:

a hollow fiber membrane inserted in a module case, the hollow fiber being a plurality of hollow fiber membranes bundled together, both end faces of the hollow fiber membrane bundle being integrated with the module case by a potting material, wherein a storage liquid is filled in 90% or more of pores of the hollow fiber membrane bundle, the storage liquid being water free of viable bacteria, a space portion inside the module case is filled with a gas free of viable bacteria and the storage liquid, the method comprising:

when a connection piping portion present in the module case is sealed by a blind cap, adjusting $W_{all}$ inside the hollow fiber membrane module so that the following expression (1) is satisfied: $0.35 \leq W_{all}/V_{all} \leq 0.95$ . . . (1), where $V_{first}$ is a volume of a first space surrounded by an inner surface of a cap attached to the module case, an end face of the potting material, and inner surfaces and end faces at both ends of the hollow fiber membranes, $V_{second}$ is a volume of a second space surrounded by an inner surface of a pipe portion of the module case, the end face of the potting material, and outer surfaces of the hollow fiber membranes, $V_{pore}$ is a volume of a third space formed by the pores of the hollow fiber membranes, $V_{all}$ is a total volume of $V_{first}$, $V_{second}$, and $V_{pore}$, $W_{first}$ is a volume of water present in the first space, $W_{second}$ a volume of water present in the second space, $W_{pore}$ second is a total volume of water present in the third space, and $W_{all}$ is a total volume of $W_{first}$, $W_{second}$, and $W_{pore}$, transition the hollow fiber membrane module to a state where no viable bacteria are present in water and a gas by thermally treating at 80° C. to 125° C. while a piping connection port is sealed.

[12]

The manufacturing method of a hollow fiber membrane module according to [11], wherein a relative humidity inside the module case is maintained to 85% or higher in the step of thermally treating the hollow fiber membrane module in which the pure water and the gas are sealed.

[13]

The manufacturing method of a hollow fiber membrane module according to or [12], comprising heating an outside of the hollow fiber membrane module by dry air in the step of thermally treating the hollow fiber membrane module in which the pure water and the gas are sealed.

[14]

The manufacturing method of a hollow fiber membrane module according to any one of to [13], wherein in the hollow fiber membrane module in which an aseptic connector is attached to the piping connection port provided to the module case, a pressure difference between a pressure inside the module case and a pressure outside the module case at 20° C. before start of the thermal treatment is 0 kPa, and the pressure difference between the pressure inside the module case and the pressure outside the module case separated by a sterile filter of the aseptic connector during the thermal treatment is 20 kPa or less.

[15]

The manufacturing method of a hollow fiber membrane module according to any one of to [14], wherein in the step of thermally treating the module case having the water and the gas sealed therein, the thermal treatment is carried out while the piping connection port in the module case is sealed by a blind cap.

[16]

The manufacturing method of a hollow fiber membrane module according to any one of to [15], wherein the thermal treatment is carried out while the hollow fiber membrane module is wrapped by a wrapping film having a first portion, at least part of which has gas permeability.

[17]

The manufacturing method of a hollow fiber membrane module according to [16], wherein the module case is cylindrical, and at least a part of the piping connection port provided to the module case protrudes in a direction perpendicular to a longitudinal direction of the module case, in the step of thermally treating the hollow fiber membrane module having the water and the gas sealed therein, the hollow fiber membrane module is wrapped by the wrapping film so that a second portion of the wrapping film, which has a smaller gas permeability than the first portion, is positioned within a range of 120° centered around a direction rotated by 90° relative to a direction of protrusion of the port or within a range of 60° centered around an opposite direction of the direction of protrusion, in a radial direction of an axis of the module case.

[18]

A cleaning method of a hollow fiber membrane module, wherein when an inside of a hollow fiber membrane module manufactured by the manufacturing method according to any one of [11] to [17] is cleaned by filtration cleaning, an TOC of filtrated water becomes 500 ppb or less by filtrating pure water at 20 $L/m^2$ or less per membrane area of the hollow fiber membranes.

According to the present disclosure, because water free of viable bacteria as the storage liquid for the membrane module to maintain filtration performance and a gas free of viable bacteria are contained at an appropriate ratio, the hollow fiber membrane module in a sterilized state can be provided while maintaining the filtration performance of the membranes.

Gamma ray sterilization or electron beam irradiation sterilization can be selected as a treatment for the hollow fiber membrane module prior to use. However, even in such cases, the environment inside the hollow fiber membrane module prior to irradiation can be maintained in a constant state, there is therefore no need to adjust the irradiation dose each time and sterilization can be achieved with a minimum amount of irradiation.

In addition, after the filtration module is attached in an apparatus, filtration operation can be started after minimum rinsing.

DETAILED DESCRIPTION

Hereinafter, a hollow fiber membrane module employing one embodiment of a hollow fiber membrane module of the present disclosure will be described with reference to the drawings.

A hollow fiber membrane module of the present embodiment can be used for cell separation after culture in biopharmaceutical production, and for purification and concentration of biopharmaceuticals. The hollow fiber membrane module of the present embodiment can be used for internal pressure filtration. Hollow fiber membrane modules are required to have high filtration performance in order to reduce the sizes of facilities, and the hollow fiber membrane module of the present embodiment can be a hollow fiber membrane module that allows for a higher filtration flow rate per unit volume.

Figure 1:
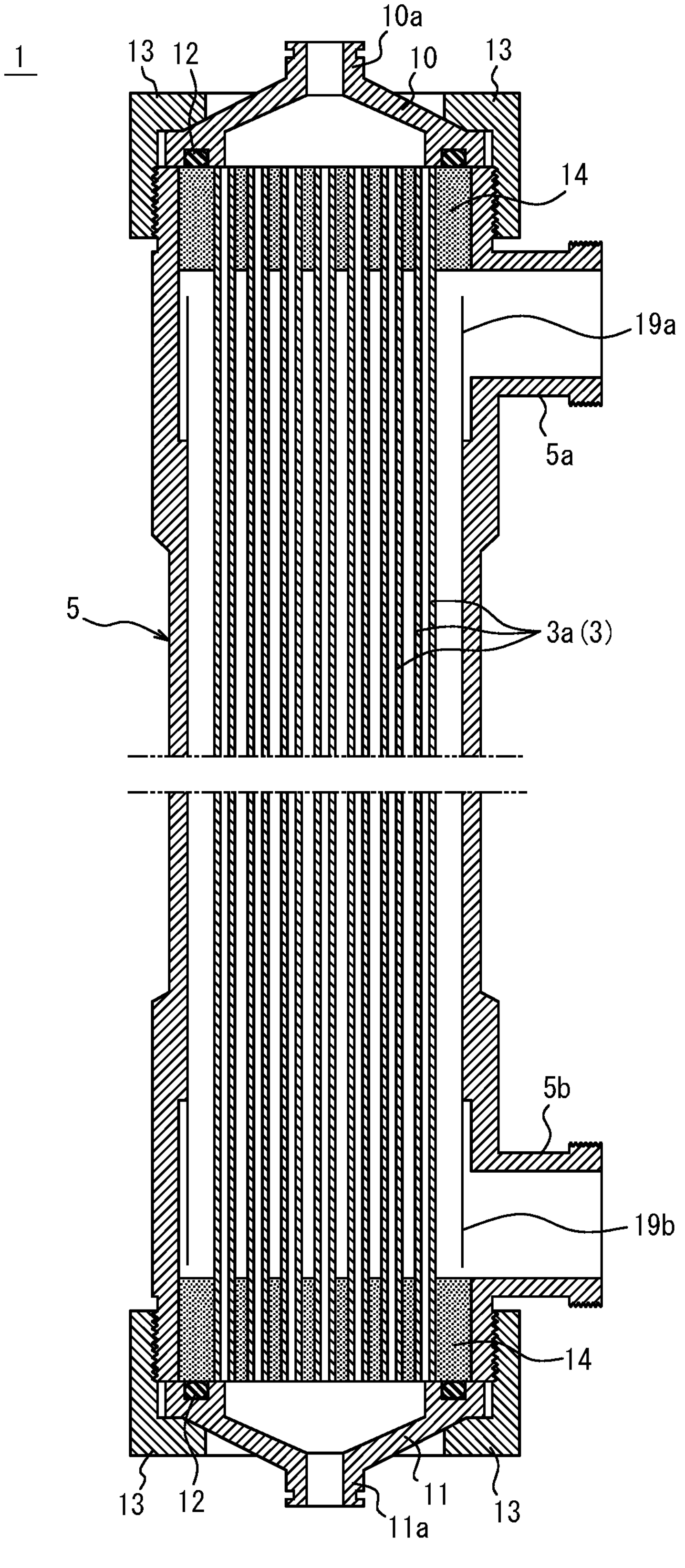
FIG. 1 is a cross-sectional view illustrating a configuration of a hollow fiber membrane module employing one embodiment of a filtration membrane module of the present disclosure.
Figure 2:
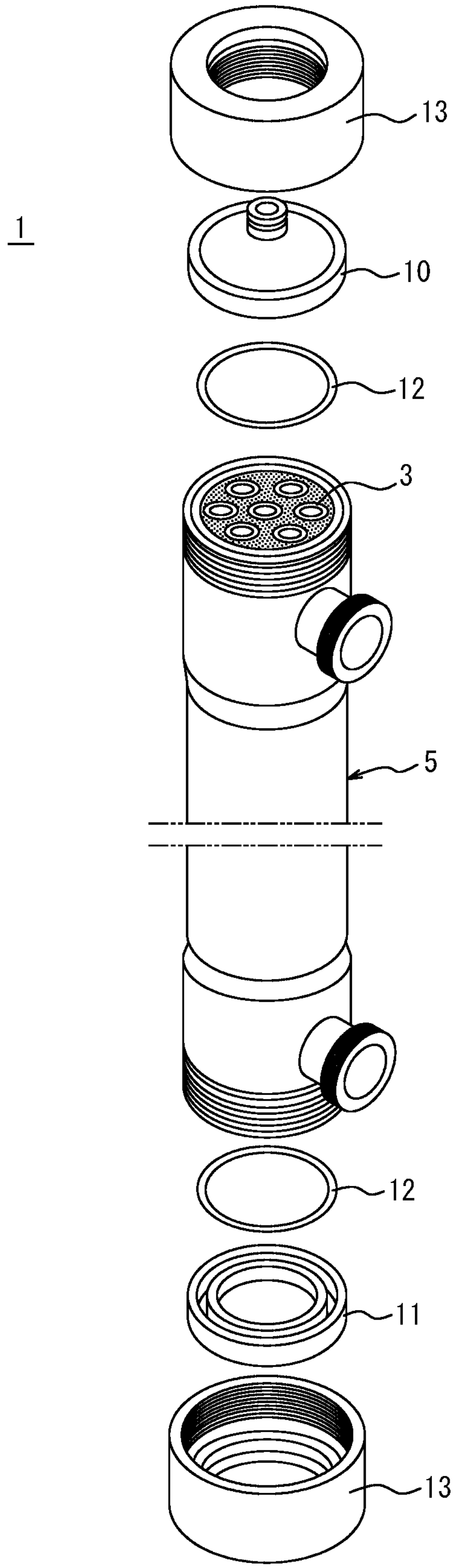
FIG. 2 is an exploded perspective view of the hollow fiber membrane module.

FIG. 1 is a cross-sectional view illustrating a schematic configuration of a hollow fiber membrane module 1 of the present embodiment. In addition, FIG. 2 is an exploded perspective view of the hollow fiber membrane module 1 illustrated in FIG. 1.

As illustrated in FIG. 1, the hollow fiber membrane module 1 in the present embodiment includes a hollow fiber membrane bundle 3 that is a plurality of hollow fiber membranes 3*a* bundled together, and a cylindrical module case 5 (hereinafter sometimes referred to as "case") that accommodates the hollow fiber membrane bundle 3.

Piping connection caps 10 and 11 are provided at the openings at both ends of the case 5, and conduits 10*a* and 11*a* to which piping are to be connected are formed to the caps 10 and 11. The piping connection caps 10 and 11 are fixedly attached to the case 5 by nuts 13. The nuts 13 are screwed into male threads formed in the side surfaces of the both ends of the case 5. By tightening the nuts 13, O-rings 12 placed in grooves in the caps 10, 11 seal between the both ends of the case 5 and the caps 10, 11.

Upper and lower nozzles 5*a* and 5*b* are formed at the both end portions of the case 5, through which fluid is to flow. The upper and lower nozzles 5*a* and 5*b* are provided so as to protrude in the direction perpendicular to the longitudinal direction of the case 5.

At both end faces of the hollow fiber membrane bundle 3, each hollow fiber membrane 3*a* is open. At the both end faces, the hollow fiber membranes 3*a* are bonded together by a potting material to form fixation portions 14. The both ends of the hollow fiber membrane bundle 3 are integrated by the potting material.

In the internal pressure filtration technique, for example, a liquid is introduced through the cap 11, the liquid flows into hollow portions of the opened hollow fiber membranes, the liquid permeates from the inner surface of each hollow fiber membrane 3*a* between the fixation portions 14 at the both ends, and the liquid that has passed to the outer surface of each hollow fiber membrane flows out through the upper nozzle 5*a*, for example. In external pressure filtration, for example, a liquid is introduced through the lower nozzle the liquid permeates from the outer surface of each hollow fiber membrane 3*a* between the fixation portions 14 at the both ends, and the liquid that has passed through the hollow portion of each hollow fiber membrane 3*a* flows out of through conduits 10*a*, 11*a* of the cap 10, 11.

Microfiltration membranes, ultrafiltration membranes, or the like can be used as the hollow fiber membranes 3*a*. The material of the hollow fiber membranes is not limited. Example thereof include polysulfone, polyethersulfone, polyacrylonitrile, polyimide, polyetherimide, polyamide, polyetherketone, polyetheretherketone, polyethylene, polypropylene, poly(4-methylpentene), ethylene-vinyl alcohol copolymer, cellulose, cellulose acetate, polyvinylidene fluoride, and ethylene-tetrafluoroethylene copolymer, and polytetrafluoroethylene, and composite materials of these can also be used.

The inner diameter of the hollow fiber membranes 3*a* is 50 μm to 3000 μm, preferably 50 μm to 2000 μm. The inner diameter of the hollow fiber membranes 3*a* is preferably 50 μm or more because a small inner diameter increases the pressure loss and adversely affects filtration. In addition, the inner diameter is preferably 3000 μm or less because it is difficult to maintain the shape of the membrane during the manufacturing of the fibers in a configuration with a large inner diameter.

Polymeric materials, such as epoxy resins, vinylester resins, urethane resins, unsaturated polyester resins, olefinic polymers, silicone resins, and fluorine-containing resins are preferred as the potting material, and any of these polymeric materials may be used or a combination of multiple polymeric materials may be used.

Note that, in the manufacturing process of biopharmaceuticals and the production of ultra-pure water for semiconductor applications, the components are required to have high heat resistance to hot water during cleaning and to have low elution characteristic. Therefore, the material of the hollow fiber membranes 3*a* is preferably a material with low elution, such as polyvinylidene fluoride, polysulfone, polyethersulfone, and polyphenylsulfone. The material of the case 5 is also preferably a material with low elution, such as polysulfone-based materials. For the same reason, an epoxy resin is preferably used as the potting material.

In addition, in the hollow fiber membrane module 1 of the present embodiment, an appropriate amount of water free of viable bacteria serving as a storage liquid is sealed in the space inside the case. Specifically, the storage liquid is contained in 90% or more of the pores of the hollow fiber membrane bundle 3 in the hollow fiber membrane module 1. The storage liquid is a liquid for maintaining the filtration performance of the hollow fiber membranes 3*a*. Water free of viable bacteria is water defined as follows. A sample is collected from the hollow fiber membrane module and incubated for 48 to 72 hours at 25 to 35° C. in a total count sampler available from Merck Millipore, Inc. If no colony is observed visually and under a magnifying microscope at a magnification of about 20×, the water is confirmed to be water free of viable bacteria. The internal space other than the space occupied by the storage liquid is occupied by a gas free of viable bacteria. Therefore, the hollow fiber membrane module is turned ten times up and down in the longitudinal direction of the hollow fiber membrane module while the hollow fiber membrane module is sealed with blind caps, and a sampled water is incubated with a total count sampler available from Merck Millipore for 48 to 72 hours at 25 to 35° C. If no colony is observed visually and under a magnifying microscope at a magnification of about 20×, the water and the gas are confirmed to be free of viable bacteria. It is desirable to use a gas from which particulates have been removed in advance by a HEPA filter or other means. Air may be used as the gas, or a nitrogen atmosphere may be used to further reduce oxidative degradation of the components used in the hollow fiber membrane module during thermal sterilization. After the storage liquid and the gas are filled, the water and the gas may then be sterilized by thermal sterilization.

Figure 3:
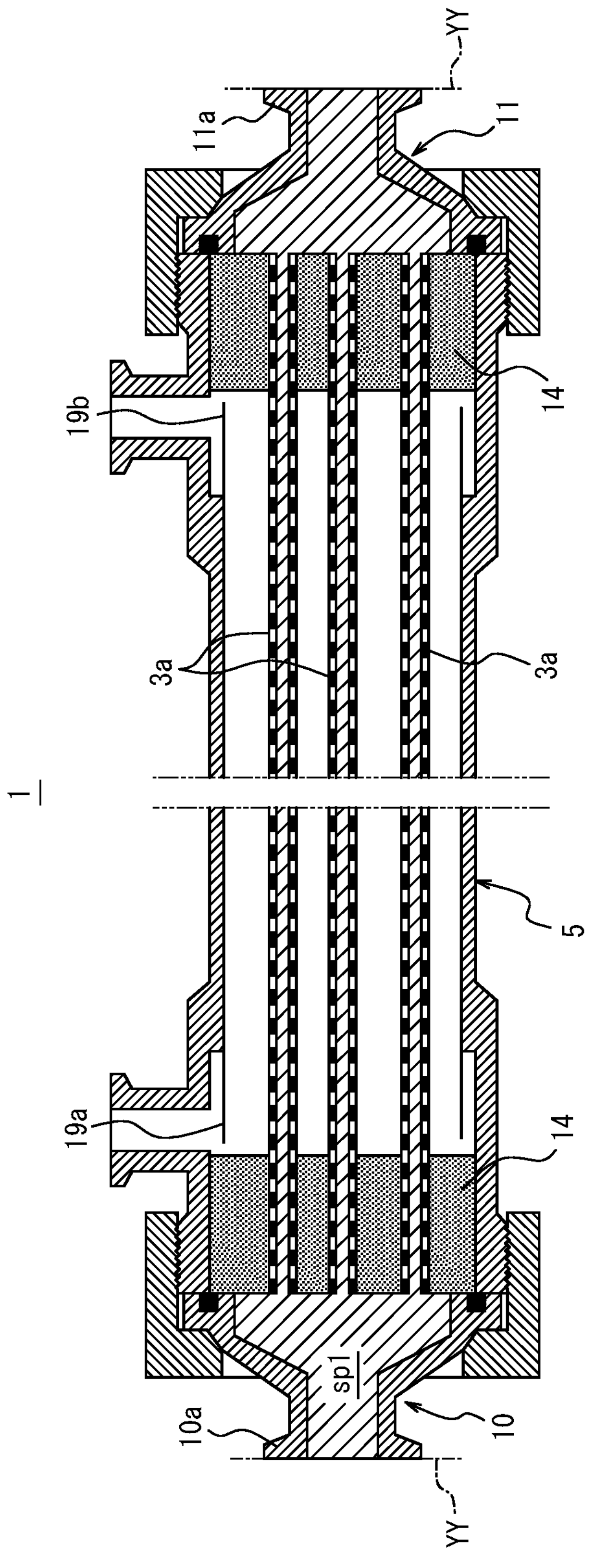
FIG. 3 is a cross-sectional view illustrating a part of the space inside the hollow fiber membrane module.
Figure 4:
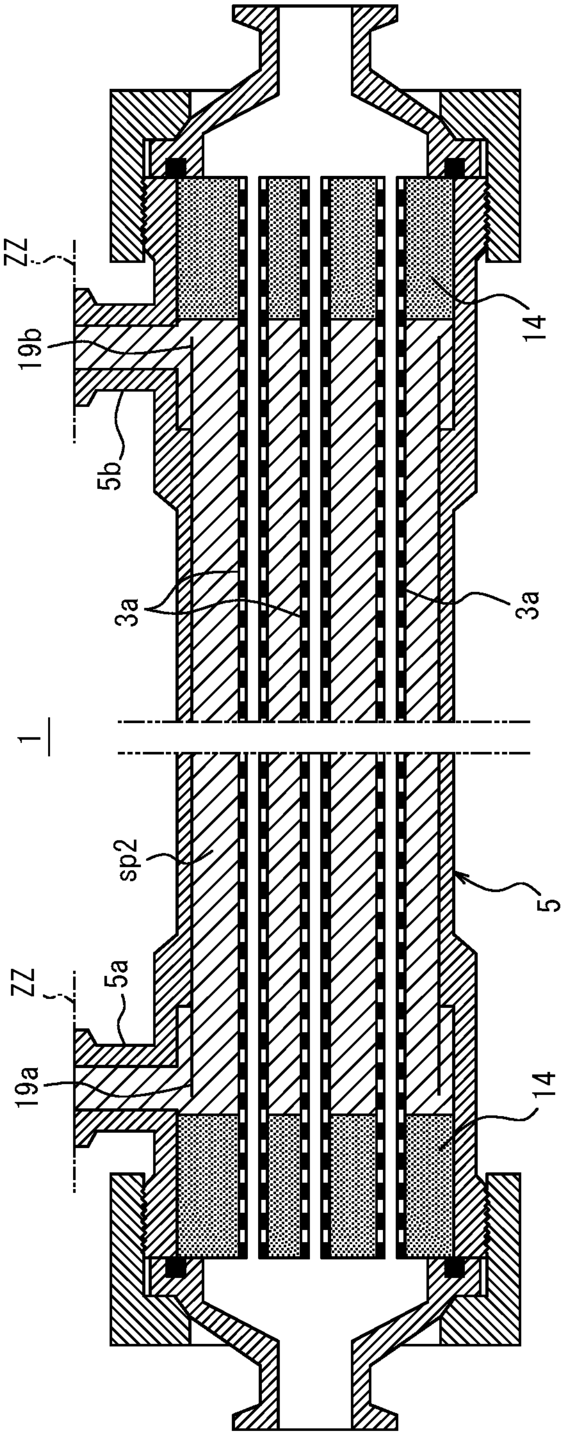
FIG. 4 is a cross-sectional view illustrating another part of the space inside the hollow fiber membrane module.
Figure 5:
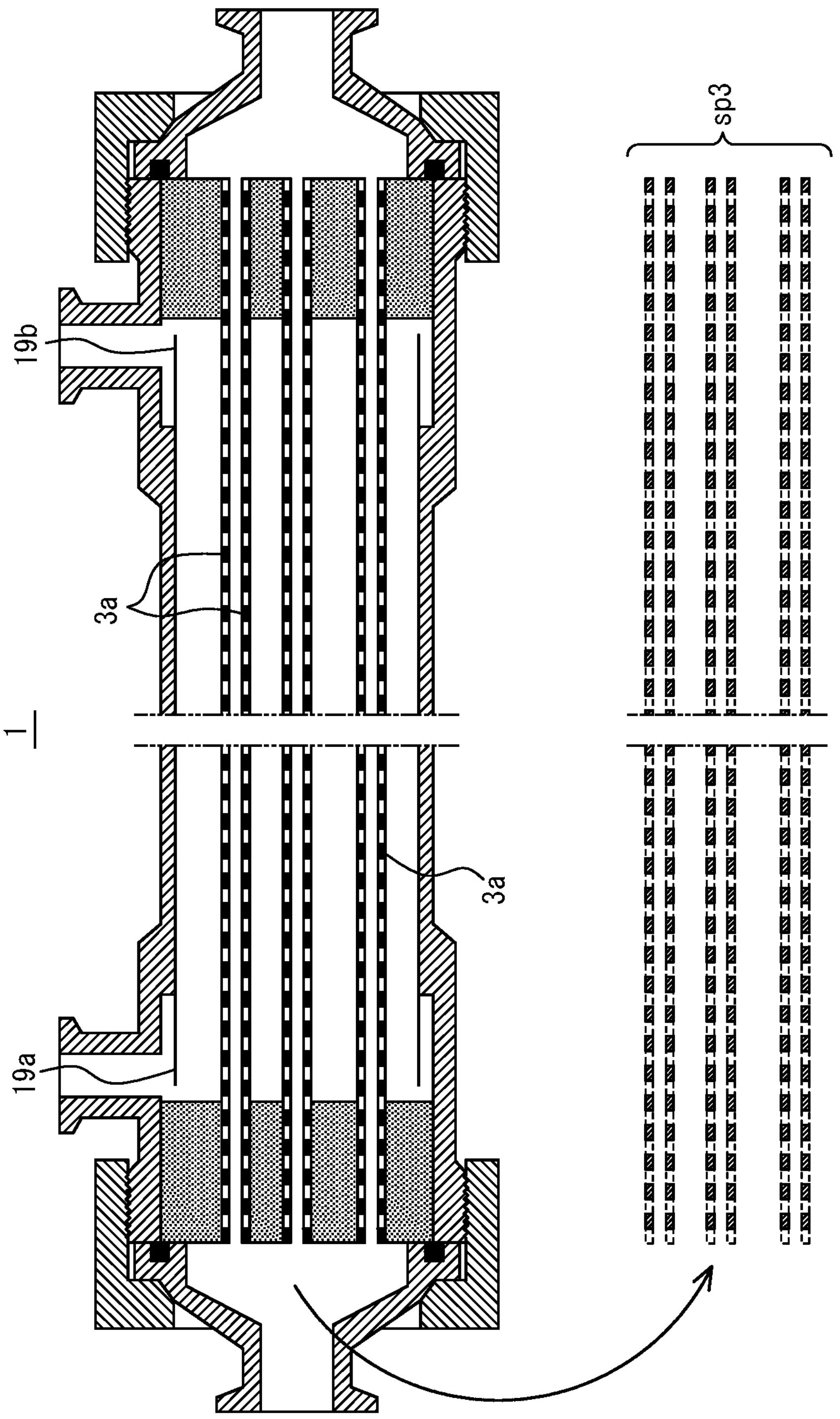
FIG. 5 is a cross-sectional view illustrating yet another part of the space inside the hollow fiber membrane module.

Here, the space that is present inside the hollow fiber membrane module will be described. The space inside the hollow fiber membrane module 1 is classified into the following three areas, when the piping connection ports are sealed by sealing members. Specifically, the piping connection ports are the upper nozzle 5*a*, the lower nozzle 5*b*, and the conduits 10*a*, 11*a*. Specifically, the sealing members are blind caps, which will be discussed below. As illustrated in FIG. 3, a first space sp1 is defined by the inner surface of the cap 10, the inner surface of the cap 11, a first blind cap YY attached to each of the caps 10 and 11, the end faces on the opening side of the hollow fiber membranes 3*a* formed by the fixation portion 14 and the hollow fiber membranes 3*a*, and the inner surfaces of the hollow fiber membranes 3*a*. The volume of the first space sp1 is defined as $V_{first}$. The first blind caps YY are virtual flat plates that seal the end faces of the conduits 10*a*, 11*a*. As illustrated in FIG. 4, the second space sp2 is defined by the inner surface of the case 5, the end faces opposite to the opening side of the hollow fiber membranes 3*a* in the fixation portions 14, a second blind cap ZZ attached to each of the upper and lower nozzles 5*a* and 5*b*, and the outer surfaces of the hollow fiber membranes 3*a*. The volume of the second space is defined as $V_{second}$. The second blind caps ZZ are virtual flat plates that seal the end faces of the nozzle sections 5*a* and 5*b*. As illustrated in FIG. 5, the third space sp3 is the space formed by the pores present in the hollow fiber membrane 3*a*. The volume occupied by the third space sp3 is defined as $V_{pore}$. The total volume of $V_{first}$, $V_{second}$, and $V_{pore}$ is defined as $V_{all}$. In addition, the volume of the storage liquid present in the first space sp1 is defined as $W_{first}$, the volume of the storage liquid present in the second space sp2 is defined as $W_{second}$, and the volume of the storage liquid present in the third space sp3 is defined as $W_{pore}$. The total volume of the storage liquid present in the first space sp1, the second space sp2, and the third space sp3 is defined as $W_{all}$.

Here, $W_{all}/V_{all}$ preferably 0.35 or more and 0.95 or less. If $W_{all}/V_{all}$ is smaller than 0.35, the storage liquid contained in the pores of the hollow fiber membranes 3*a* may volatilize during thermal sterilization, and the expected filtration performance may not be achieved. In addition, if $W_{all}/V_{all}$ is smaller than 0.35, bubbles may be generated during a leak test conducted prior to filtration operation, which may be misinterpreted as the occurrence of a leak in the hollow fiber membranes. If $W_{all}/V_{all}$ is greater than 0.95, the internal pressure of the case 5 during thermal sterilization will be increased, which may affect the durability of the product.

When the water content ratio in the pores of the hollow fiber membranes 3*a* is defined as $W_{pore}/V_{pore}$, $W_{pore}/V_{pore}$ is 0.9 or more, preferably 0.98 or more even after thermal sterilization.

Furthermore, when the water content ratio on the primary side of the hollow fiber membrane module is defined as $W_{first}/V_{first}$ and the water content ratio on the secondary side is defined as $W_{second}/V_{second}$, the relationship between the water content amount preferably satisfies: $W_{first}/V_{first} \leq W_{second}/V_{second}$. If $W_{first}/V_{first} \leq W_{second}/V_{second}$ is satisfied, a larger proportion of water is contained in the space $V_{second}$ which is preferentially heated during the thermal sterilization treatment. Accordingly, this process can be performed while preventing dryness of the hollow fiber membranes. On the other hand, When $W_{first}/V_{first}$ is kept to be smaller than $W_{second}/V_{second}$, water expanded by the thermal sterilization treatment moves from the outer surface side to the inner surface side through the pores of the hollow fiber membranes 3*a*, which mitigates the internal pressure increase in the case 5. In addition, by keeping $W_{first}/V_{first}$ smaller, the hollow fiber membrane module 1 after filling with the storage liquid can be made lighter, which is advantageous from the viewpoint of transportation.

Furthermore, the water content ratio $W_{second}/V_{second}$ of the second space sp2 is preferably 0.8 or more and 1 or less. If the water content ratio $W_{second}/V_{second}$ is 0.8 or more, the temporary decrease in the relative humidity of the second space sp2 during the temperature increase in the thermal sterilization treatment can be suppressed and the process time can be shortened. Furthermore, although it depends on the filling ratio of hollow fiber membranes 3*a* relative to the inner diameter of the case 5 before the thermal sterilization treatment, if the water content ratio $W_{second}/V_{second}$ is 0.8 or more, the outer surface of the case 5 can be made to be immersed with water free of viable bacteria when the case is placed horizontally in the axial direction. Therefore, the occurrence of drying during thermal sterilization can be further reduced. If the water content ratio $W_{second}/V_{second}$ is 0.8 or more, vibration of the hollow fiber membranes 3*a* caused by vibration of bubbles during transportation of the hollow fiber membrane module 1 is suppressed, and the possibility of damage can be reduced.

In the hollow fiber membrane module 1, respective flow guide cylinders 19*a*, 19*b* are disposed between the upper and lower nozzles 5*a* and 5*b* and the hollow fiber membranes 3*a*. The flow guide cylinders 19*a*, 19*b* may be cylinders coaxial with the inner circumference of the case 5. One ends of the flow guide cylinders 19*a*, 19*b* and the fixation portions 14 are preferably separated from each other. There are two types of the hollow fiber membrane module 1 used in biopharmaceutical manufacturing applications: single-use type modules that are disposed of after one-time use, and modules that are repeatedly used after a cleaning operation. In the case of the repeated use type, the hollow fiber membrane module 1 is subjected to a history of thermal cycles due to sterilization by means of hot water or steam at 80° C. or higher, and the configuration in which parts of the flow guide cylinders 19*a*, 19*b* are embedded in the fixation portions 14, a crack starting from the fixation portions 14 may be generated. On the other hand, when the flow guide cylinders 19*a*, 19*b* are separated from the fixation portions 14 as in the above configuration, the product can be used for a longer period of time while being remained in good condition. The separation distance in the axial direction of the case 5 is preferably between 1 mm and 20 mm, although it varies depending on the location. If the separation distance is less than 1 mm, there is a possibility that the flow guide cylinders 19*a*, 19*b* and the fixation portions 14 may contact in a part of areas, depending on the method to apply an adhesive. In contrast, in the configuration where the separation distance is 20 mm or more, a filtrate may flow in or a cleaning solution used during cleaning may flow in due to backwash cleaning from the separated areas, which increases the local flow rate and imparts a load on the roots of the hollow fiber membranes 3*a*, in other words, the area near the fixation portions 14.

In addition, in the hollow fiber membrane module 1 of the present embodiment, the content of organic matter in the storage liquid as TOC (Total Organic Carbon) is preferably 1 ppm or more and less than 50 ppm. If the TOC is 1 ppm or more, the organic matter in the water is preferentially oxidized during thermal sterilization of water to be described below, and the oxidative degradation of the hollow fiber membranes 3*a* due to heating can be suppressed. Note that the TOC is more preferably 5 ppm or more.

If the TOC is less than 50 ppm, it is possible to quickly reduce the concentration of organic matter in the storage liquid at the start of use of the hollow fiber membrane module 1, as well as reducing the time required for rinsing before starting operation and the amount of a rinsing solution.

Furthermore, in the hollow fiber membrane module 1 of the present embodiment, the concentration of metal ions in contained the storage liquid is preferably 10 ppb or more and less than 100 ppb. In the biopharmaceutical process, contamination with metal ions that adversely affect the pharmaceuticals produced should be avoided, and a lower content is thus more preferred. On the other hand, when sterilization is taken into consideration, metal ions are known to exhibit sterilizing effects. Thus, it is possible to improve the sterilizing effects by heating through inclusion of metal ions to the extent that they do not adversely affect the manufacturing of pharmaceuticals and to the extent that rinsing can be performed easily.

The hollow fiber membrane module 1 of the present embodiment described above can suppress the growth of bacteria during storage while providing filtration performance that satisfies the requirements when the hollow fiber membrane module 1 is used in biopharmaceutical applications. Note that the hollow fiber membrane module 1 of the present embodiment can be used as a final filter for ultrapure water production used in semiconductor manufacturing applications, enabling rapid reduction of the concentration of organic matter in the storage liquid while also achieving filtration performance.

Figure 6:
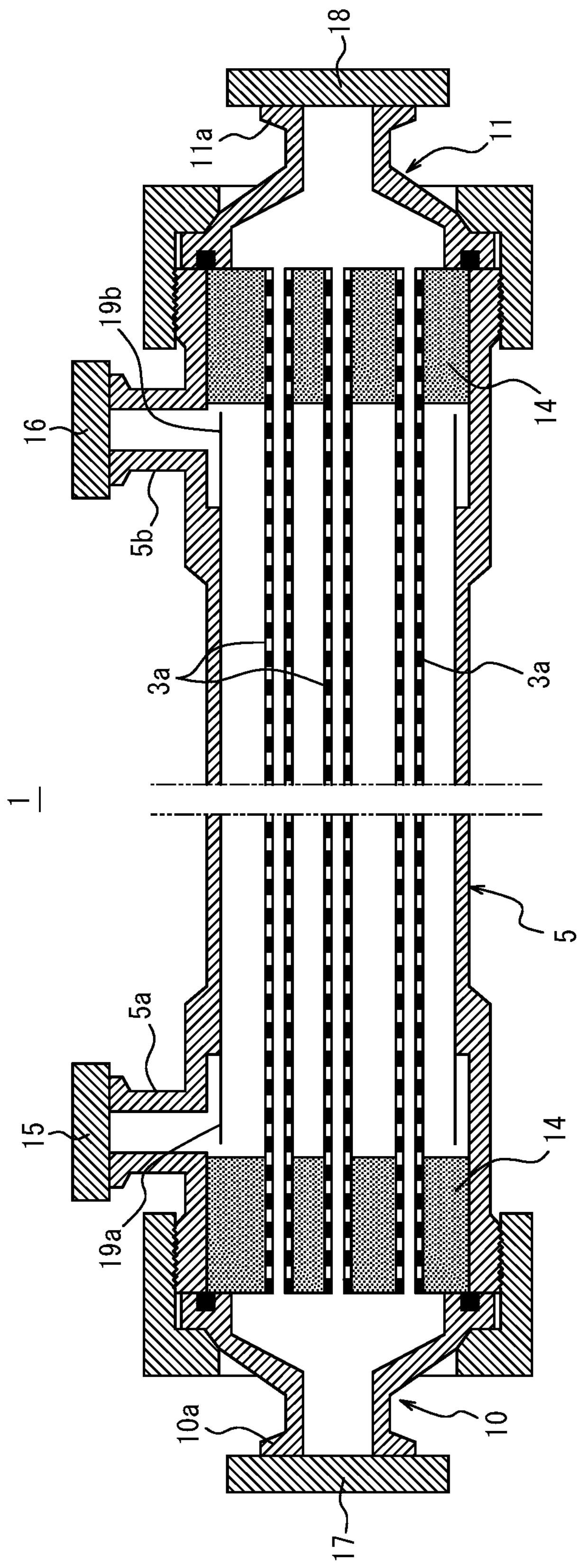
FIG. 6 is a cross-sectional view illustrating the state where piping connection ports of the hollow fiber membrane module are sealed with blind caps.

All of the upper nozzle 5*a*, the lower nozzle 5*b*, and the conduits 10*a*, 11*a*, which are piping connection ports provided in the case 5, are preferably sealed by blind caps 15, 16, 17, and 18, respectively, as illustrated in FIG. 6. The preferred material for the blind caps 15, 16, 17, and 18 is a material with a linear expansion coefficient of 0.95 times to 1.05 times the linear expansion coefficient of the plastic material used in the case 5. More preferably, the material similar to the material employed for the case 5 may be used. In addition, the blind caps 15, 16, 17, and 18 may be provided with handles. After the hollow fiber membrane module 1 is subjected to a thermal sterilization treatment, the pressure inside the hollow fiber membrane module 1 may become negative pressure relative to the outside pressure depending on the ambient temperature when being opened and the sealing of the blind caps may be too tight. Even in such cases, handles facilitate the blind caps 15, 16, 17, 18 to be opened. The shape of the handle can be selected from various shapes, such as L-shape, T-shape, and U-shaped.

Figure 7:
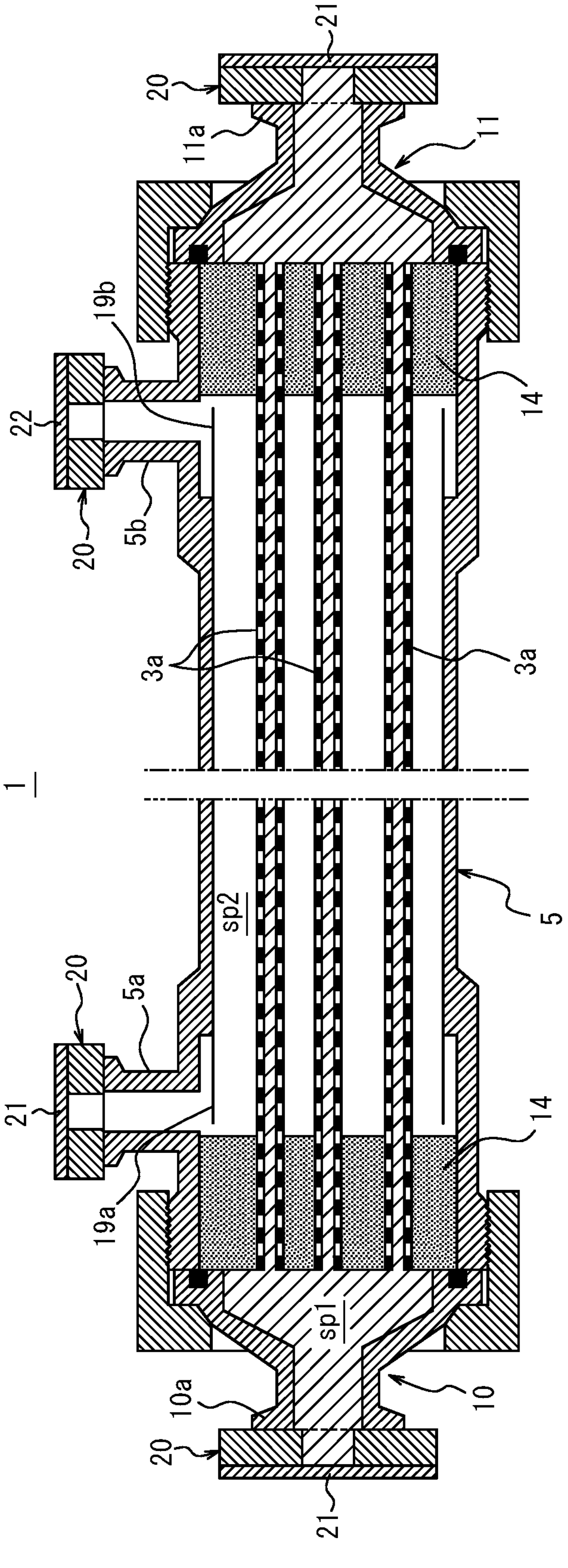
FIG. 7 is a cross-sectional view illustrating the state where the piping connection ports are sealed with aseptic connectors.

Aseptic connectors 20 may be used as blind caps for sealing the nozzle portions of the case 5, as illustrated in FIG. 7. Aseptic connectors 20 are components that can be connected in a non-aseptic environment without compromising the internal asepticity of piping to be connected, and may be particularly suitable for use in single-use components. The aseptic connectors 20 may include a sterile filter 21. One end face of the sterile filter 20 may be in direct contact with the space inside the hollow fiber membrane module 1, in other words, the first space sp1 and the second space sp2.

The hollow fiber membrane module 1 can be wrapped in a wrapping film made of a plastic, and stored and transported to prevent water evaporation during storage. Low-density polyethylene, high-density polyethylene, polypropylene, polyvinylidene chloride, and the like are suitably used as the film material for the wrapping film. Or, when a thermal sterilization treatment using an autoclave is performed on the hollow fiber membrane module 1 which has been wrapped, the wrapping film may be a sterile bag. A sterile bag is one that has a porous first portion that prevents bacteria from entering from the outside to the inside of the bag while allowing water vapor to permeate freely. The first portion has gas permeability. Alternatively, the wrapping film may be formed by bonding the outer edges of a film having a first portion and a film having a second portion made of high-density polyethylene, polypropylene, or the like. The second portion has smaller gas permeability than the first portion.

The total weight of the hollow fiber membrane module 1 of the present disclosure, including the storage liquid, can be 15 kg or more. In addition, the hollow fiber membrane module 1 has portions, such as the corners of the nuts 13, where loads tend to concentrate when the hollow fiber membrane module 1 is placed horizontally in the longitudinal direction. If the first portion of the wrapping film is disposed between such a portion and the floor surface during installation, the pores of the first portion may be crushed, which may compromise the durability of the wrapping film. Therefore, it is preferable to provide the first portion outside the area of the wrapping film that is in contact with the area of the hollow fiber membrane module 1 where the load is likely to be concentrated. In other words, it is preferable to provide a second portion in the area of the wrapping film that is in contact with the area of the hollow fiber membrane module 1 where the load is likely to be concentrated.

Figure 8:
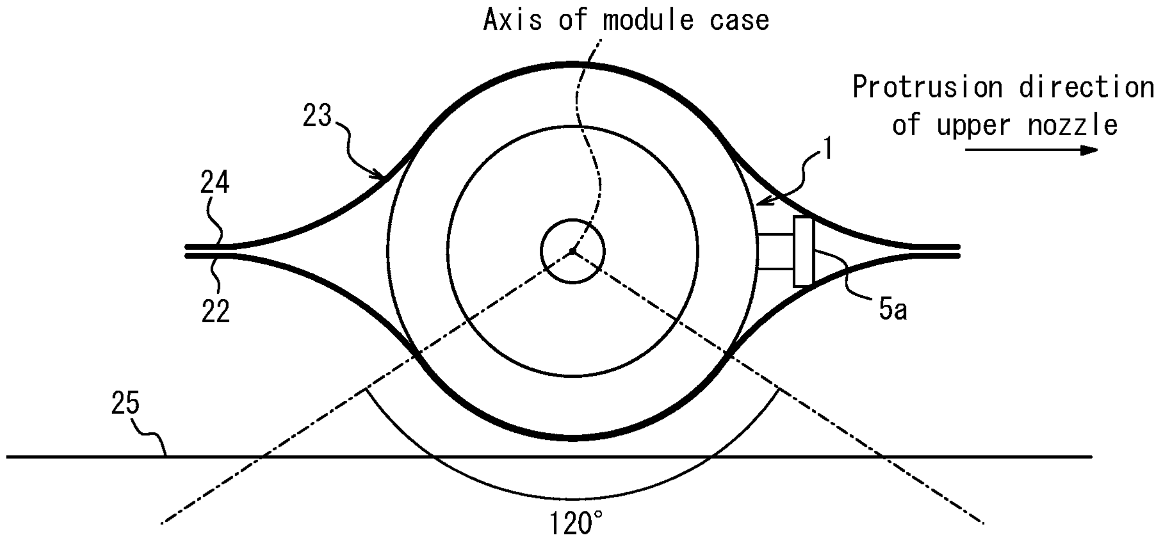
FIG. 8 is a diagram for illustrating a location of a second portion in a wrapping film in which the hollow fiber membrane module is accommodated.
Figure 9:
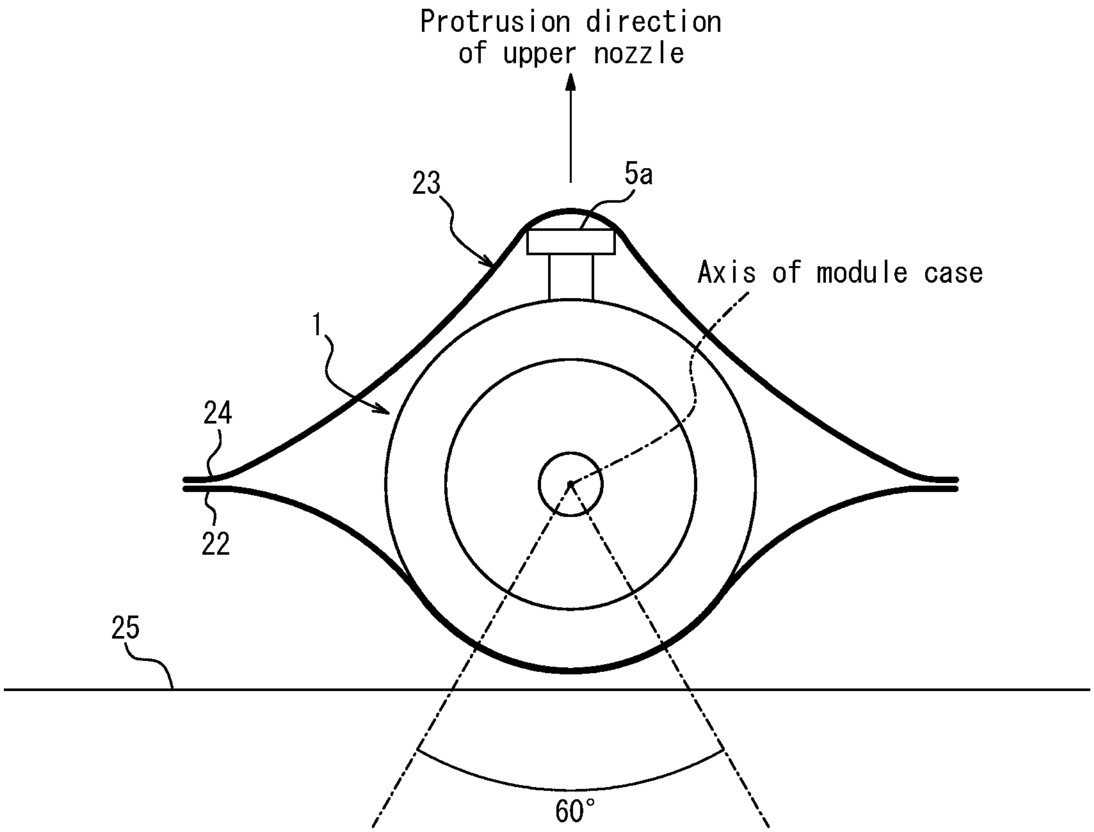
FIG. 9 is a diagram for illustrating another location of a second portion in a wrapping film in which the hollow fiber membrane module is accommodated.

As illustrated in FIG. 8, the hollow fiber membrane module 1 is wrapped by the wrapping film 23 so that the second portion 22 is positioned within a range of 120° centered around the direction rotated by 90° from the direction of protrusion of the upper nozzle 5*a* and the lower nozzle 5*b*, in the radial direction of the axis of the module case 5. Alternatively, as illustrated in FIG. 9, the hollow fiber membrane module 1 is wrapped by the wrapping film 23 so that the second portion 22 is positioned within a range of 60° centered around the opposite direction of the direction of protrusion of the upper nozzle and the lower nozzle 5*b*, in the radial direction of the axis of the module case 5. Generally, when the hollow fiber membrane module 1 is placed, the posture is adjusted so that the upper nozzle 5*a* and the lower nozzle 5*b* face the horizontal direction side or the vertically upward side. The hollow fiber membrane module 1 may also be placed so that the upper nozzle 5*a* and the lower nozzle 5*b* contact the horizontal surface together with the module case 1. Hence, by wrapping in the wrapping film 23 as described above, in the porous first portion 24 that is porous, the possibility that the porous portion 22 is sandwiched between a stationary portion 24 and the module case 5 on the vertically lower direction of the module case 5 can be reduced. The stationary portion 24 is the floor, a platform, the inner bottom of a container, or the like on which the hollow fiber membrane module 1 is placed.

Alternatively, the hollow fiber membrane module 1 wrapped with the wrapping film 23 may be wrapped so that the porous portion 22 are sandwiched between the hollow fiber membrane module 1 and the stationary portion 24, as long as the compressive strength generated in the porous portion 22 is 10 kPa or less when the hollow fiber membrane module 1 is placed on the stationary portion 24. For example, the compressive strength to the porous portion 22 can be reduced by placing the hollow fiber membrane module 1 so that the load is not concentrated on the porous portion 22, but is distributed to other areas.

The hollow fiber membrane module 1 of the present embodiment described above can prevent the thick portions of the hollow fiber membranes 3*a* from drying during the thermal sterilization treatment, prevent bacteria growth during storage, and prevent damage to the hollow fiber membranes 3*a* due to vibration during transportation, while satisfying the water quality requirements required in the biomedical field.

Next, a manufacturing method of the hollow fiber membrane module 1 of the present embodiment will be described.

In a manufacturing method of the hollow fiber membrane module 1 of the present embodiment, water sterilized by filtration and a gas are first introduced in the case 5 of the hollow fiber membrane module 1 in the state illustrated in FIG. 1 before the storage liquid is filled. The water to be sealed is preferably pure water.

Here, pure water in the present disclosure refers to water from which ionic components are reduced, and which has an electrical conductivity of 1 μS/cm or less and has been filtrated through a reverse osmosis membrane or ultrafiltration membrane. The number of particles of 50 nm or larger contained in pure water is preferably 10 particles/L or more and 200 particles/L or less.

In addition, it is preferable that water having the organic content expressed by TOC of 1 ppm or more and 50 ppm or less in the pure water is used. Furthermore, the concentration of metal ions contained in pure water is preferably 10 ppb or more and less than 100 ppb, and the concentration of chloride ions contained in pure water is preferably 25 ppb or more and less than 250 ppb.

In the manufacturing method of the hollow fiber membrane module 1 of the present embodiment, the hollow fiber membrane module 1 (case 5), to which water sterilized by filtration is sealed, is then thermally treated at 80° C. or higher and 125° C. or lower. Thus, the hollow fiber membrane module 1 can be transitioned to a state where the water and the gas inside are free of viable bacteria by further heat sterilizing the water which has been sterilized by filtration along with the gas.

Although addition of a chemical agent is one method of sterilizing water, in the case of hollow fiber membrane modules used in the biopharmaceutical field, it is preferable to sterilize water by heating without adding any unnecessary component because the cleaning operation before filtration operation requires time and pure water for cleaning, and the wastewater from the cleaning process also increases.

When water is sterilized by heating, as in the present embodiment, even if the temperature is below 80° C., a lot of viable bacteria are killed by carrying out heating over a long period of time. However, in view of long-term storage of three months or longer, it is desirable to heat the water to 80° C. or higher to sufficiently kill bacteria. On the other hand, if the heating temperature is 125° C. or higher, components may be damaged due to the difference in thermal expansion coefficients of the components. In view of these, the temperature of the thermal treatment is preferably 80° C. or higher and 125° C. or lower, as in the present embodiment. In addition, when the hollow fiber membrane module 1 of the present embodiment is further sterilized by gamma rays after the thermal treatment, the inside of the hollow fiber membrane module 1 can always be kept in the same condition by performing a thermal sterilization treatment at 85° C. or higher to 95° C. or lower before gamma ray irradiation, and sterilization can be achieved with a minimum gamma ray irradiation.

In cases where the hollow fiber membrane module 1 is thermally treated as described above, if the space inside the case 5 is full of water (in other words, if $V_{all}=W_{all}$), the thermal expansion of the water causes a pressure increase inside the module, which might damage the hollow fiber membranes 3*a* and the case 5. One method to alleviate this pressure increase is to make the inside and outside of the module communicate to each other. However, in this case, water that has expanded in volume due to the thermal treatment would overflow to the outside, and the volume contraction upon cooling might cause the intake of outside air, which might lead to the introduction of bacteria from the atmosphere into the module. In addition, after cooling, blind caps for the piping connection ports of the hollow fiber membrane module 1 must be replaced with new ones for final storage and transportation purposes, which would require a cumbersome operation.

To avoid these issues, in the manufacturing method of the hollow fiber membrane module 1 of the present embodiment, a gas is preferably contained in at least one of the first space sp1, the second space sp2, and the third space sp3 of the hollow fiber membrane module 1 at a certain ratio so that the pressure increase can be mitigated even if the water filled as the storage liquid expands due to heating.

In addition, in the step of thermally treating the hollow fiber membrane module 1 to which water and the gas have been sealed, the relative humidity of the gas inside the hollow fiber membrane module 1 is constantly preferably 85% or more, more preferably 90% or more to prevent dryness of the hollow fiber membranes 3*a*. If the relative humidity is below 85%, the hollow fiber membrane 3*a* may become dry depending on the total time during which the relative humidity is below the limit. In particular, dryness may occur in the hollow fiber membranes 3*a* located at the outermost periphery of the hollow fiber membrane bundle 3. As a manufacturing method in which the relative humidity is kept to a certain level or higher, heating may be divided into multiple stages and the temperature may be increased in stages. Or, since the temperature of the second space sp2 inside the hollow fiber membrane module 1 rises first upon heating, it is desirable that the water content ratio in the second space sp2 is high. Or, the outermost hollow fiber membranes 3*a* which are relatively distant from the cluster of the hollow fiber membrane bundle 3 tend to become dry more easily. As such, the hollow fiber membrane bundle 3 may be constrained with a net-like constraint member to prevent a part of the hollow fiber membranes 3*a* from separating from the cluster of the other hollow fiber membranes 3*a*.

The method to heat the hollow fiber membrane module 1 can be selected as appropriate, but the hollow fiber membrane module 1 can be heated from outside thereof with dry air, moist heat, or pressurized steam. Microwaves may also be used. During heating, the hollow fiber membrane module 1 may be placed horizontally in the longitudinal direction during heating, or it may be held approximately perpendicularly to the ground, or thermal treatment may be performed while the hollow fiber membrane module 1 is rotated around the longitudinal axis of the hollow fiber membrane module 1.

It is also preferable that blinds caps are attached to the piping connection ports in the hollow fiber membrane module 1 prior to the start of the thermal treatment, in other words, the thermal sterilization treatment. Alternatively, aseptic connectors 20 may be attached. Sterile filters 21 that are attached to the aseptic connectors 20 for preventing the influx of bacteria, so that the connection ports are sealed. To prevent the sterile filters 21 from peeling off due to an increase in the internal pressure of the hollow fiber membrane module 1, the pressure difference between the inside and outside of the hollow fiber membrane module 1 before the start of the thermal treatment is preferably 0 kPa at an external temperature of 20° C., and the pressure difference between the inside and outside of the hollow fiber membrane module 1 during the thermal treatment is preferably within 20 kPa, more preferably within 10 kPa. The thermal treatment described above is preferably performed while the piping connection ports are sealed by blind caps.

Next, one example of an aspect in which the hollow fiber membrane module 1 of the present embodiment is installed in a filtration apparatus 100 for filtration for biopharmaceuticals will be described with reference to FIG. 10, and a rinsing method and a filtration method using the hollow fiber membrane module 1 of the present embodiment will be further explained. It is assumed that the cross-flow filtration technique by means of internal pressure filtration is used in this filtration treatment apparatus 100 for filtration for biopharmaceuticals.

Figure 10:
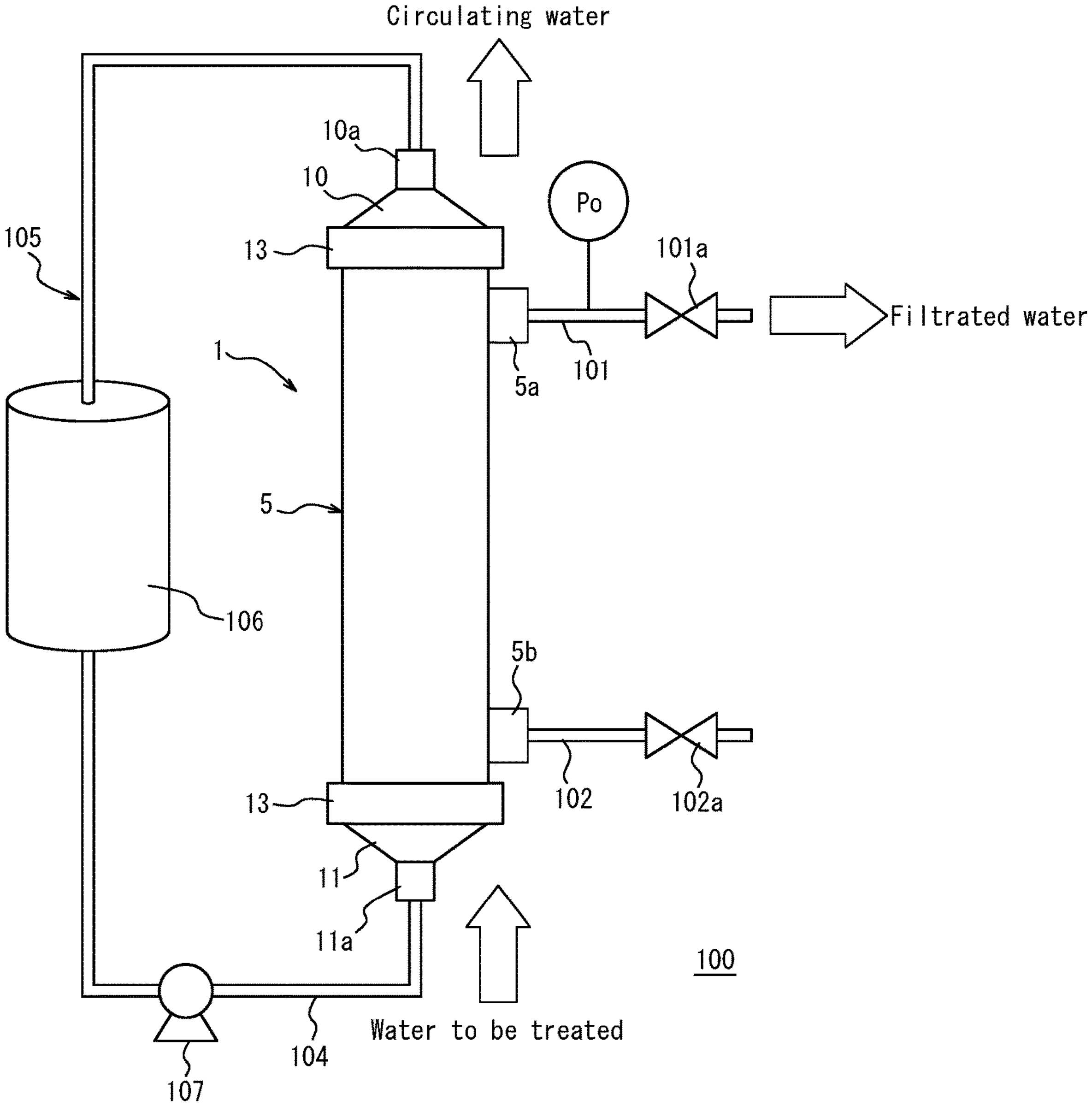
FIG. 10 is a diagram illustrating a detailed configuration of each part of a filtration apparatus employing the hollow fiber membrane module illustrated in FIG. 1.

As illustrated in FIG. 10, the filtration apparatus 100 is used, for example, for filtrating water to be treated containing cells and target proteins after culture. The filtration apparatus 100 includes a hollow fiber membrane module 1, a first filtrated water collection piping 101, a second filtrated water collection piping 102, a first valve 101*a*, a second valve 102*a*, supply piping 104, and circulation piping 105. First filtrated water collection piping 101 and second filtrated water collection piping 102 are connected to an upper nozzle 5*a* and a lower nozzle 5*b* of the hollow fiber membrane module 1, respectively. The first filtrated water collection piping 101 is provided with a first valve 101*a*. The second filtrated water collection piping 102 is provided with a second valve 102*a*. One end of the supply piping 104 is connected to a conduit 11*a* of the hollow fiber membrane module 1. The other end of the supply piping 104 is connected to a treatment water tank 106. A pump 107 is provided in the supply piping 104. The pump 107 pressurizes water to be treated discharged from below the treatment water tank 106 and supply it to the hollow fiber membrane module 1. One end of the circulation piping 105 is connected to the conduit 10*a* of the hollow fiber membrane module 1. The other end of the circulation piping 105 is connected to the top of the treatment water tank 106. In the filtration apparatus 100, the hollow fiber membrane module 1 is positioned so that the axial direction of the case 5 is parallel to the vertical direction and the cap 10 is located above the cap 11.

In the filtration apparatus 100, the water to be treated is supplied from the treatment water tank 106 through the supply piping 104 and the lower conduit 11*a* to the hollow portion, i.e., the insides of the hollow fiber membranes 3*a*. The supplied water to be treated is filtrated to the outer surface sides of the hollow fiber membranes 3*a*, and the filtrate is collected from the upper nozzle 5*a* while the lower nozzle 5*b* of the case 5 is closed. For example, the lower nozzle 5*b* is closed by closing a valve 102*a*, which is connected to the lower nozzle 5*b* via the second filtrated water collection piping 102, which will be described below. Most of the supplied water to be treated is discharged as circulating water from the upper conduit 10*a* the hollow fiber membrane bundle 3 and returned to the treatment water tank 106 through the circulation piping 105.

When the hollow fiber membrane module 1 is installed in the filtration apparatus 100 described above, the blind caps 15, 16, 17, and 18 for sealing the hollow fiber membrane module 1, which are one of the embodiments, are opened, and the storage liquid sealed inside the hollow fiber membrane module 1 is then discharged to the piping outside the water treatment apparatus 100. The hollow membrane module 1 is then attached to the piping of the filtration apparatus 100. Upon installation, the hollow fiber membrane module 1 may be installed to the water treatment apparatus 100 after the storage liquid in the hollow fiber membrane module 1 is discharged outside the system.

Alternatively, the aseptic connectors 20 for sealing the hollow fiber membrane module 1, which are another embodiment, may be connected to aseptic connectors attached to the piping of the filtration apparatus 100 and the sterile filters 21 are peeled off, which allows for connection while maintaining the asepticity inside the hollow fiber membrane module 100 and the piping of the filtration apparatus 100.

Here, a cleaning method of the hollow fiber membrane module 1 before it is used in a filtration operation will be described. After the hollow fiber membrane module 1 is attached to the filtration apparatus 100, pure water is introduced into the hollow portion (primary side) of the hollow fiber membranes 3*a* of the hollow fiber membrane module 1 at a predetermined pressure from the supply piping 104 through the lower conduit 11*a*. In the hollow portion, most of the pure water is filtrated through the hollow fiber membranes 3*a* and moves to the outer surface side (secondary side) of the hollow fiber membranes 3*a*. The filtrated pure water is then drained from the upper nozzle 5*a* of the hollow fiber membrane module 1. Alternatively, the drained water (filtrated pure water) may be drained from the lower nozzle 5*b* of the hollow fiber membrane module. In addition, after 5 L/m$^2$ or 10 L/m$^2$ of water per membrane area of the hollow fiber membrane module 1 has been filtrated, all pure water present on the outer surface side of the hollow fibers (secondary side) may be drained through the lower nozzle 5*b* of the hollow fiber membrane module, and then pure water is introduced again from the lower cap 11*a*. In this manner, the inside of the hollow fiber membrane module 1 can be cleaned more efficiently. The TOC on the filtrated water side can be kept 500 ppb or lower after filtration is performed with 20 L/m$^2$ or less of pure water per membrane area of the hollow fiber membrane module 1.

EXAMPLES

The present embodiment will now be described in more details with reference to examples and comparative examples, yet it is noted that the present embodiment is not limited to these examples.

In the following examples and comparative examples, hollow fiber membrane modules were used. The characteristics thereof and measurement methods are as follows.

Hollow Fiber Membranes

Usage Example 1

Material: PVDF
Pore size: 0.1 μm (microfiltration membrane)
Inner diameter/outer diameter: 1.4 mm/2.2 mm
(Usage Example 2)
Material: Polysulfone
Fractional molecular weight: 6000 Da
Inner diameter/outer diameter: 0.6 mm/1.0 mm

Method to Confirm Effectiveness of Sterilization

Water sealed in a hollow fiber membrane module was sampled and whether or not viable bacteria were present or not was determined using a HPC total count sampler manufactured by Millipore (model: MHPC10025).

Analysis of TOC in Storage Liquid

The TOC in the storage liquid was analyzed using the following instrument.

TOC: T005000A manufactured by Shimadzu Corporation

Linear Expansion Coefficients of Module Case and Blind Cap

Linear expansion coefficients of module cases and blind caps were measured according to the thermo-mechanical analysis method of JIS K7197-1991.

Temperature Measurement Inside Hollow Fiber Membrane Module

A temperature sensor was inserted in the center of a hollow fiber membrane module in the longitudinal direction. The temperature sensor was disposed so that the temperature at the center of the hollow fiber membrane bundle was measured. The measurement apparatus used was TR-7wb manufactured by T&D Corporation, and a stainless steel protection tube sensor (TR-1220) was used as the temperature sensor element.

Relative Humidity Measurement Inside Hollow Fiber Membrane Module

A thermo-hygrometer (LR8514) manufactured by HIOKI E. E. CORPORATION was used for measurements of the relative humidity. Holes for wiring were drilled in advance in blind caps for sealing the nozzles and blind caps for sealing the conduits. After the wiring was set, the module was sealed with an epoxy resin and the relative humidity inside the hollow fiber membrane module was measured.

Method of Determining the Presence or Absence of Leak From Hollow Fiber Membranes And Presence or Absence of Dryness of Hollow Fiber Membranes After completion of the sterilization treatment and storage for a specified period of time, whether leak was present or not and dryness was present or not were determine by the following procedure. First, after the water inside the hollow fiber membrane module was drained, the conduits located on the primary side of the hollow fiber membrane module and one nozzle located on the secondary side of the hollow fiber membrane module were sealed with blind caps. Air of up to 0.2 MPa was then pumped from the other nozzle on the secondary side to check whether or not air bubbles were generated from the openings of the hollow fiber membranes at the end faces in the fixation portion. Samples without bubbles at this point were determined to be free of both leak and dryness. On the other hand, if bubbles were observed, the same leak test was performed again after hydrophilization treatment was performed with alcohol. If bubbles were no longer generated at this time, it was determined that dryness had occurred. If bubbles continued to be observed after the hydrophilization treatment, the hollow fiber membrane was determined to have a leak.

Method of Measuring Pure Water Permeation Amount of Hollow Fiber Membrane Module The water permeation amount through the hollow fiber membrane module at 25° C. and 0.1 MPa was calculated by introducing pure water from the inner surface side of the hollow fiber membranes, i.e., the primary side of the module, and measuring the amount of pure water permeating through to the outer surface of the hollow fiber membranes, i.e., the secondary side. The retention ratio of water permeation amount through the module was calculated from the ratio of the water permeation amounts through the hollow fiber membrane module before thermal sterilization and through the hollow fiber membrane module stored according to the three-month storage test after a thermal sterilization treatment described below.

Water Content Amount and Water Content Ratio of Pores Of Hollow Fiber Membranes After the water in the hydrophilized hollow fiber membrane module was completely drained, the weight of the hollow fiber membrane module was measured. The hollow fiber membrane module was dried in an environment of 50° C. until there was no weight loss, and weighed again. The water content amount and the water content ratio of the pores of the hollow fiber membranes were calculated from the difference between the two.

Water Content Ratios of Primary Side and Secondary Side of Hollow Fiber Membrane Module After the inside of the hydrophilic hollow fiber membrane module was filled with pure water, the water present in the primary and secondary sides was drained. The maximum water content amounts were calculated, which was used as the respective volumes of spaces. The water content amount in each example was determined as the water content amount in the first space and the second space by feeding metered amounts of water into each space. The water content ratio was calculated as the ratio of the maximum water content amount to the water fed into each space. Here, the primary side of the hollow fiber membrane module refers to the first space, and the secondary side of the hollow fiber membrane module refers to the second space. If water has been already contained in the primary and secondary sides of the hollow fiber membrane module, the respective water content amount can be calculated by the following procedure. To measure the water content amount in the primary side, all ports (top and bottom nozzles, and top and bottom conduits) are sealed with blind caps in advance. While the hollow fiber membrane module is placed so that the longitudinal direction thereof is substantially vertical to the ground, the blind caps on the conduits on the upper and lower sides of the primary side are opened. After the module is allowed to stand for 5 minutes, the water drained from the lower side of the conduit is collected. The water content amount of the primary side, in other words, the first space, can be determined from the volume of water drained at that time. To measure the water content amount in the secondary side, all ports (upper and lower nozzles, and upper and lower conduits) are sealed with blind caps in advance. While the hollow fiber membrane module is placed so that the longitudinal direction thereof is substantially vertical to the ground, the blind caps of the upper and lower nozzles are opened. Water drained from the lower nozzle is collected for 5 minutes. The water content amount of the secondary side space can be determined from the volume of water drained at that time.

Outer and Inner Diameters of Hollow Fiber Membranes

A porous hollow fiber membrane was thinly sliced in a cross section perpendicular to the longitudinal direction using a razor and the outer and inner diameters were measured with a magnifying glass of a magnification of 100×. For one sample, measurements were made at 60 cross-sections at 30 mm intervals in the length direction, and the average values were taken as the outer and inner diameters of the hollow fiber membrane.

3-Month Storage Test After Thermal Sterilization Treatment

Hollow fiber membrane modules after thermal sterilization were stored in an environment of room temperature for three months. As used therein, room temperature refers to temperatures 18° C. or higher and 25° C. or lower. Thereafter, the method of determining the presence or absence of leak and presence or absence of dryness of hollow fiber membranes described above were performed on the hollow fiber membrane modules after the storage period to determine the presence or absence of leak and dryness. The above-mentioned method for checking the sterilization effect was performed on hollow fiber membrane modules after the storage period to determine whether or not viable bacteria grew.

Thermal Cycle Storage Test at Room Temperature to 50° C.

Hollow fiber membrane modules after thermal sterilization treatment were placed horizontally in the longitudinal direction inside a dryer. After the hollow fiber membrane modules were heated under the setting of 50° C. for 48 hours, they were left exposed to the atmosphere for 24 hours and allowed to stand at room temperature (20 to 24° C.). This temperature cycle was repeated the required number of times. The above method to determine presence or absence of dryness of hollow fiber membranes was performed on hollow fiber membrane modules subjected to 10, 40, and 70 cycles of temperature cycling to determine presence or absence of dryness of hollow fiber membranes.

Random Vibration Durability Test

The following test were conducted on hollow fiber membrane modules packed in a cardboard box used for packing. The corrugated cardboard box was placed on a test platform and a packing box having a weight of 100 kg was stacked on the top of the cardboard box. Vibrations were applied while the frequency was varied in the frequency range of 1 Hz to 200 Hz and the power spectral density (PSD) was changed as needed from 0.000004 $g^2$/Hz to 0.02 $g^2$/Hz, such that the total vibration load applied was 0.53 overall Grms. Here, PSD is a numerical value representing the intensities of waves per frequency in random vibration. In this random vibration test, the hollow fiber membrane modules were subjected to vibration loading according to the random vibration test procedure (Over the Road Trailer Spectrum) of ISTA 3A. Furthermore, the packing box containing the hollow fiber membrane module was subjected to a vibration test history where no load was applied from the top of the packing box. Vibrations were varied in the frequency range of 1 Hz to 200 Hz and the PSD level was changed between 0.0005 $g^2$/Hz and 0.035 $g^2$/Hz. The test was conducted in accordance with the random vibration test procedure (Pick-up and Delivery Vehicle Spectrum) of ISTA 3A and a vibration load applied amounted to a total PSD of 0.46 overall Grms. In all tests, a test apparatus (model: G9250-L) manufactured by Shinken Co. Ltd. was used. All of the tests were carried out in an environment of 20 to 24° C. The leak determination method for hollow fiber membranes described above was applied to the hollow fiber membrane modules subjected to the vibration test to determine the presence or absence of leak.

25° C. to 75° C. Thermal Cycle Durability Test

After a hollow fiber membrane module which had been subjected to the thermal sterilization treatment was installed in the apparatus, cold water (maximum 25° C.) and hot water (maximum 75° C.) were introduced to the module alternately every 30 minutes. After completion of the target number of cycles, the membrane module was inspected to determine absence or presence of leak using the leak detection method described above.

Rinse Test

After the hollow fiber membrane module which had been subjected to the thermal sterilization treatment was installed in the filtration process apparatus, pure water was introduced from the lower side of the hollow fiber membrane module cap. The rinse operation was performed by adjusting the circulation flow rate to 1 L/min and the filtration flow rate to 10 L/min. Every minutes after the start of rinsing, pure water was sampled from the upper side of the cap of the hollow fiber membrane module and from the filtrated water side. The TOC of the sampled pure water was analyzed using the same apparatus used for analyses of the storage liquid. The elution amount from the hollow fiber membrane module was measured by measuring the TOC. The filtration amount when the TOC of pure water on the filtration water side became less than 500 ppb as the target value of filtration water quality was measured.

Example 1

Deionized water that had been filtrated through an ultrafiltration membrane in advance was filled from the primary side to the secondary side of a hollow fiber membrane module provided with a microfiltration membrane made of PVDF, and then the hollow fiber membrane module was allowed to stand still in the longitudinal direction perpendicular to the ground for 5 minutes. After the water inside was completely drained off, a predetermined amount of pure water was fed to the primary and secondary sides of the hollow fiber membrane module so that the water content ratios in the first space and the second space were adjusted to the water content ratios listed in Table 1. All piping connection ports were then sealed by clamping using blind caps made of polysulfone. The module was then placed horizontally in a dryer and thermal treatment was carried out at 90° C. for 24 hours, followed by slow cooling so that the sterilized water and gas were sealed inside the hollow fiber membrane module. Various storage and durability tests were conducted on a hollow fiber membrane module that had been sterilized. The results are as summarized in Table 1. After three months of storage at room temperature, a leak test was performed and it was confirmed that neither leak nor dryness of membranes occurred. The module water permeation amount was measured, and the retention rate compared to that before thermal sterilization was 99%, indicating that the product remained in good condition. Deionized water was collected from inside the hollow fiber membrane module and the presence or absence of viable bacteria was examined, and it was confirmed that no viable bacteria were present. A rinse test was conducted after installation to a filtration apparatus, and the TOC on the filtrated water side reached below 500 ppb with the use of only 16 L/m$^2$ of pure water per membrane area. For a hollow fiber membrane module stored in an environment of temperature cycle of 20° C. to 50° C., no dryness of the hollow fiber membranes occurred after completion of cycles, but dryness of the hollow fiber membranes was confirmed after completion of 40 cycles. The location of dryness was at the outermost periphery of the hollow fiber membrane bundle. In addition, after the thermal sterilization was completed, a leak inspection was performed after a hollow fiber membrane module was subjected to vibration. It was confirmed that no leak occurred and the hollow fiber membranes were not damaged. In addition, a cool and heat cycle test was conducted on a hollow fiber membrane module after the thermal sterilization had been completed. In Example 1, hollow fiber membrane modules having a configuration in which the fixation portions and flow guide cylinders were separated were used. After 500 cycles were completed, a leak test was performed and no leakage was observed.

Example 2

Hollow fiber membrane modules having the same configuration as in Example 1 were used for the tests. The differences were as follows: the pure water content ratio in the first space of the hollow fiber membrane module was set to $W_{first}/V_{first}$=0.05 and the pure water content ratio in the second space was set to $W_{second}/V_{second}$=0.81. The hollow fiber membrane module in Example 2, in which a heat sterilized product was stored at room temperature for three months, was confirmed to have neither dryness nor leak of the hollow fiber membranes. In addition, the module water permeability retention rate was 101%, which was a good result. No viable bacteria were found. A rinse test was conducted after installation to a filtration apparatus, and the TOC on the filtrated water side reached below 500 ppb with the use of only 15 L/m$^2$ of pure water per membrane area. For a hollow fiber membrane module stored in an environment of temperature cycle of 20° C. to 50° C., it was confirmed that no dryness of the hollow fiber membranes occurred after completion of any of 10, 40, or 70 cycles. In addition, after the thermal sterilization was completed, a leak inspection was performed after a hollow fiber membrane module was subjected to vibration. It was confirmed that no leak occurred and the hollow fiber membranes were not damaged. In addition, a cool and heat cycle test was conducted on a hollow fiber membrane module after the thermal sterilization had been completed. In Example 2, hollow fiber membrane modules having a configuration in which the fixation portions and flow guide cylinders were separated were also used. After 500 cycles were completed, a leak test was performed and no leakage was observed.

Example 3

Hollow fiber membrane modules having the same configuration as in Example 1 were used for the tests. The differences were as follows: the pure water content ratio in the first space of the hollow fiber membrane module was set to $W_{first}/V_{first}$=0.07 and the pure water content ratio in the second space was set to $W_{second}/V_{second}$=0.9. After a thermally sterilized product was stored at room temperature for three months, it was confirmed that neither dryness nor leak of the hollow fiber membrane occurred. In addition, the module water permeability retention rate was 100%, which was a good result. No viable bacteria were found. A rinse test was conducted after installation to a filtration apparatus, and the TOC on the filtrated water side reached below 500 ppb with the use of only 15 L/m$^2$ of pure water per membrane area. For a hollow fiber membrane module stored in an environment of temperature cycle of 20° C. to 50° C., it was confirmed that no dryness of the hollow fiber membranes occurred after completion of any of 10, 40, or 70 cycles. In addition, after the thermal sterilization was completed, a leak inspection was performed after a hollow fiber membrane module was subjected to vibration. It was confirmed that no leak occurred and the hollow fiber membranes were not damaged. In addition, a cool and heat cycle test was conducted on a hollow fiber membrane module after the thermal sterilization had been completed. In Example 3, hollow fiber membrane modules having a configuration in which the fixation portions and flow guide cylinders were separated were also used. After 500 cycles were completed, a leak test was performed and no leakage was observed.

Example 4

Hollow fiber membrane modules having the same configuration as in Example 1 were used for the tests. The differences were as follows: the pure water content ratio in the first space of the hollow fiber membrane module was set to $W_{first}/V_{first}$=0.28 and the pure water content ratio in the second space was set to $W_{second}/V_{second}$=0.98. After a thermally sterilized product was stored at room temperature for three months, it was confirmed that neither dryness nor leak of the hollow fiber membrane occurred. In addition, the module water permeability retention rate was 103%, which was a good result. No viable bacteria were found. A rinse test was conducted after installation to a filtration apparatus, and the TOC on the filtrated water side reached below 500 ppb with the use of only 15 L/m$^2$ of pure water per membrane area. For a hollow fiber membrane module stored in an environment of temperature cycle of 20° C. to 50° C., it was confirmed that no dryness of the hollow fiber membranes occurred after completion of any of 10, 40, or 70 cycles. In addition, after the thermal sterilization was completed, a leak inspection was performed after a hollow fiber membrane module was subjected to vibration. It was confirmed that no leak occurred and the hollow fiber membranes were not damaged. In addition, a cool and heat cycle test was conducted on a hollow fiber membrane module after the thermal sterilization had been completed. In Example 4, hollow fiber membrane modules having a configuration in which the fixation portions and flow guide cylinders were separated were also used. After 500 cycles were completed, a leak test was performed and no leakage was observed.

Example 5

Hollow fiber membrane modules having the same configuration as in Example 1 were used for the tests. The differences were as follows: the pure water content ratio in the first space of the hollow fiber membrane module was set to $W_{first}/V_{first}$=0.65 and the pure water content ratio in the second space was set to $W_{second}/V_{second}$=0.96. After a thermally sterilized product was stored at room temperature for three months, it was confirmed that neither dryness nor leak of the hollow fiber membrane occurred. In addition, the module water permeability retention rate was 99%, which was a good result. No viable bacteria were found. A rinse test was conducted after installation to a filtration apparatus, and the TOC on the filtrated water side reached below 500 ppb with the use of only 14 L/m$^2$ of pure water per membrane area. For a hollow fiber membrane module stored in an environment of temperature cycle of 20° C. to 50° C., it was confirmed that no dryness of the hollow fiber membranes occurred after completion of any of 10, 40, or 70 cycles. In addition, after the thermal sterilization was completed, a leak inspection was performed after a hollow fiber membrane module was subjected to vibration. It was confirmed that no leak occurred and the hollow fiber membranes were not damaged. In addition, a cool and heat cycle test was conducted on a hollow fiber membrane module after the thermal sterilization had been completed. In Example 5, hollow fiber membrane modules having a configuration in which the fixation portions and flow guide cylinders were separated were also used. After 500 cycles were completed, a leak test was performed and no leakage was observed.

Example 6

Hollow fiber membrane modules having the same configuration as in Example 1 were used for the tests. The differences were as follows: the pure water content ratio in the first space of the hollow fiber membrane module was set to $W_{first}/V_{first}$=0.92 and the pure water content ratio in the second space was set to $W_{second}/V_{second}$=0.95. After a thermally sterilized product was stored at room temperature for three months, it was confirmed that neither dryness nor leak of the hollow fiber membrane occurred. In addition, the module water permeability retention rate was 99%, which was a good result. No viable bacteria were found. A rinse test was conducted after installation to a filtration apparatus, and the TOC on the filtrated water side reached below 500 ppb with the use of only 14 L/m$^2$ of pure water per membrane area. For a hollow fiber membrane module stored in an environment of temperature cycle of 20° C. to 50° C., it was confirmed that no dryness of the hollow fiber membranes occurred after completion of any of 10, 40, or 70 cycles. In addition, after the thermal sterilization was completed, a leak inspection was performed after a hollow fiber membrane module was subjected to vibration. It was confirmed that no leak occurred and the hollow fiber membranes were not damaged. In addition, a cool and heat cycle test was conducted on a hollow fiber membrane module after the thermal sterilization had been completed. In Example 6, hollow fiber membrane modules having a configuration in which the fixation portions and flow guide cylinders were separated were also used. After 500 cycles were completed, a leak test was performed and no leakage was observed.

Comparative Example 1

Hollow fiber membrane modules having the same configuration as in Example 1 were used for the tests. The differences were as follows: the pure water content ratio in the first space of the hollow fiber membrane module was set to $W_{first}/V_{first}$=0.07 and the pure water content ratio in the second space was set to $W_{second}/V_{second}$=0.08. The heat sterilized product was stored at room temperature for 3 months, and bubbles were observed to be generated from one location of the hollow fiber membranes. After the hydrophilization treatment was applied again, a leak test was performed and no bubbles were observed, indicating that the hollow fiber membranes had dryness. In addition, the module water permeability retention rate was 98%, which was a good result. No viable bacteria were found. A rinse test was conducted after installation to a filtration apparatus, and the TOC on the filtrated water side reached below 500 ppb with the use of only 18 $L/m^2$ of pure water per membrane area. For a hollow fiber membrane module stored in an environment of temperature cycle of 20° C. to 50° C. a leak test was carried out after completion of 10 cycles, and bubbles were observed to be generated from the hollow fiber membranes in three locations. Then, after the hydrophilization treatment was applied again, a leak test was performed and no bubbles were observed, indicating that the hollow fiber membranes had dryness.

Comparative Example 2

Hollow fiber membrane modules having the same configuration as in Example 1 were used for the tests. The difference was as follows: hollow fiber membrane modules were subjected to a three-month storage test at room temperature without a history of thermal sterilization. After three months of storage at room temperature, a leak test was performed and no bubbles were observed. In addition, the module water permeability retention rate was 99%, which was a good result. The presence or absence of viable bacteria was inspected and the presence of bacteria was confirmed. A rinse test was conducted after installation to a filtration apparatus, and the TOC on the filtrated water side reached below 500 ppb with the use of only 18 $L/m^2$ of pure water per membrane area.

Comparative Example 3

Hollow fiber membrane modules having the same configuration as in Example 1 were used for the tests. The differences were as follows: the pure water content ratio in the first space of the hollow fiber membrane module was set to $W_{first}/V_{first}=1.00$ and the pure water content ratio in the second space was set to $W_{second}/V_{second}=1.00$. When the piping connection ports were sealed with blind caps and heat treatment was performed at a set temperature of 90° C., the internal pressure of the hollow fiber membrane module increased to 560 kPa, causing the housing to be subjected to a relatively high pressure hi story.

Example 7

Hollow fiber membrane modules having the same configuration as in Example 1 were used for the tests. The differences were as follows: the pure water content ratio in the first space of the hollow fiber membrane module was set to $W_{first}/V_{first}=0.47$ and the pure water content ratio in the second space was set to $W_{second}/V_{second}=0.53$. After a thermally sterilized product was stored at room temperature for three months, it was confirmed that neither dryness nor leak of the hollow fiber membrane occurred. In addition, the module water permeability retention rate was 97%, which was a good result. No viable bacteria were found. A rinse test was conducted after installation to a filtration apparatus, and the TOC on the filtrated water side reached below 500 ppb with the use of only 16 $L/m^2$ of pure water per membrane area. For a hollow fiber membrane module stored in an environment of temperature cycle of 20° C. to 50° C., it was confirmed that no dryness of the hollow fiber membranes occurred after completion of any of 10, 40, or 70 cycles. On the other hand, leak inspection was conducted after vibration was applied to the hollow fiber membrane module after the thermal sterilization had been completed, and occurrence of leakages from two locations were confirmed. In addition, a cool and heat cycle test was conducted on a hollow fiber membrane module after the thermal sterilization had been completed. In Example 7, hollow fiber membrane modules having a configuration in which the fixation portions and flow guide cylinders were separated were also used. After 500 cycles were completed, a leak test was performed and no leakage was observed.

Example 8

Hollow fiber membrane modules having the same configuration as in Example 1 were used for the tests. The differences were as follows: the pure water content ratio in the first space of the hollow fiber membrane module was set to $W_{first}/V_{first}=0.28$ and the pure water content ratio in the second space was set to $W_{second}/V_{second}=0.31$. After a thermally sterilized product was stored at room temperature for three months, it was confirmed that neither dryness nor leak of the hollow fiber membrane occurred. In addition, the module water permeability retention rate was 99%, which was a good result. No viable bacteria were found. A rinse test was conducted after installation to a filtration apparatus, and the TOC on the filtrated water side reached below 500 ppb with the use of only 17 $L/m^2$ of pure water per membrane area. For a hollow fiber membrane module stored in an environment of temperature cycle of 20° C. to 50° C., it was confirmed that no dryness of the hollow fiber membranes occurred after completion of any of 10, 40, or 70 cycles. After the completion of thermal sterilization, a leak inspection was performed after the hollow fiber membrane module was subjected to vibration, and no bubbles were observed, confirming that no leaks had occurred. In addition, a cool and heat cycle test was conducted on a hollow fiber membrane module after the thermal sterilization had been completed. In Example 8, hollow fiber membrane modules having a configuration in which the fixation portions and flow guide cylinders were separated were also used. After 500 cycles were completed, a leak test was performed and no leakage was observed.

Example 9

Hollow fiber membrane modules having the same configuration as in Example 1 were used for the tests. The differences were as follows: the pure water content ratio in the first space of the hollow fiber membrane module was set to $W_{first}/V_{first}=0.98$ and the pure water content ratio in the second space was set to $W_{second}/V_{second}=0.08$. After a thermally sterilized product was stored at room temperature for three months, it was confirmed that neither dryness nor leak of the hollow fiber membrane occurred. In addition, the module water permeability retention rate was 98%, which was a good result. No viable bacteria were found. A rinse test was conducted after installation to a filtration apparatus, and the TOC on the filtrated water side reached below 500 ppb with the use of only 16 $L/m^2$ of pure water per membrane area. For a hollow fiber membrane module stored in an environment of temperature cycle of 20° C. to 50° C., leak inspection was conducted after completion of 10 cycles and no bubbles were observed and no leakage occurred. However, after 40 and 70 cycles were completed, it was confirmed that dryness had occurred in the hollow fiber membranes when leak inspection was conducted. After the completion of thermal sterilization, a leak inspection was performed after the hollow fiber membrane module was subjected to vibration, and no bubbles were observed, confirming that no leaks had occurred. In addition, a cool and heat cycle test was conducted on a hollow fiber membrane module after the thermal sterilization had been completed. In Example 9, hollow fiber membrane modules having a configuration in which the fixation portions and flow guide cylinders were separated were also used. After 500 cycles were completed, a leak test was performed and no leakage was observed.

Example 10

Hollow fiber membrane modules having the same configuration as in Example 1 were used for the tests. The differences were as follows: the pure water content ratio in the first space of the hollow fiber membrane module was set to $W_{first}/V_{first}$=0.98 and the pure water content ratio in the second space was set to $W_{second}/V_{second}$=0.49. After a thermally sterilized product was stored at room temperature for three months, it was confirmed that neither dryness nor leak of the hollow fiber membrane occurred. In addition, the module water permeability retention rate was 100%, which was a good result. No viable bacteria were found. A rinse test was conducted after installation to a filtration apparatus, and the TOC on the filtrated water side reached below 500 ppb with the use of only 16 L/m$^2$ of pure water per membrane area. For a hollow fiber membrane module stored in an environment of temperature cycle of 20° C. to 50° C., a leak test was carried out after 10, 40, and 70 cycles were completed, and no bubbles were generated from the hollow fiber membranes, confirming that no leaks occurred. On the other hand, after applying vibration to the hollow fiber membrane module after the thermal sterilization had been completed, a leak inspection was conducted and confirmed that bubbles were generated from the hollow fiber membrane at one location, indicating that a leak had occurred. In addition, a cool and heat cycle test was conducted on a hollow fiber membrane module after the thermal sterilization had been completed. In Example 10, hollow fiber membrane modules having a configuration in which the fixation portions and flow guide cylinders were separated were also used. After 500 cycles were completed, a leak test was performed and no leakage was observed.

Example 11

Deionized water that had been filtrated through an ultrafiltration membrane in advance was filled from the primary side to the secondary side of a hollow fiber membrane module provided with a microfiltration membrane made of polysulfone, and then the hollow fiber membrane module was allowed to stand still in the longitudinal direction perpendicular to the ground for 5 minutes. After the water inside was completely drained off, a predetermined amount of pure water was fed to the primary side of the hollow fiber membrane module so that the pure water content ratio in the first space was set to $W_{first}/V_{first}$=0.07 and the pure water content ratio in the secondary side space was set to $W_{second}/V_{second}$=0.99. All piping connection ports were then sealed by clamping using blind caps made of polysulfone. The module was then placed horizontally in a dryer and thermal treatment was carried out at 90° C. for 24 hours, followed by slow cooling so that the sterilized water and gas were sealed inside the hollow fiber membrane module Various storage and durability tests were conducted on a hollow fiber membrane module that had been sterilized. The results are as summarized in Table 3. After three months of storage at room temperature, a leak test was performed and it was confirmed that neither leak nor dryness of membranes occurred. The module water permeation amount was measured, and the retention ratio compared to that before the thermal sterilization was 102%, indicating that the product remained in good condition. Deionized water was collected from inside the hollow fiber membrane module and the presence or absence of viable bacteria was examined, and it was confirmed that no viable bacteria were present. A rinse test was conducted after installation to a filtration apparatus, and the TOC on the filtrated water side reached below 500 ppb with the use of only 15 L/m$^2$ of pure water per membrane area. For a hollow fiber membrane module stored in an environment of temperature cycle of 20° C. to 50° C., no dryness of the hollow fiber membranes occurred after completion of any of 10, 40, or 70 cycles. In addition, after the membrane module was subjected to vibration after thermal sterilization was completed, a leak test was conducted. It was confirmed that no leakage occurred and that the hollow fiber membrane was not damaged. In addition, a cool and heat cycle test was conducted on a hollow fiber membrane module after the thermal sterilization had been completed. At the completion of 500 cycles, there were no leaks or other defects. However, a leak inspection was conducted after 700 cycles, and a leak was confirmed at one location. After the module was disassembled to check the leak location, the starting point was found to be where the flow guide cylinder was buried in the fixation portion.

Example 12

Hollow fiber membrane modules the same as hollow fiber membrane modules in Example 11 were used. The difference was as follows: the pure water content ratio in the first space of the hollow fiber membrane module is set to $W_{first}/V_{first}$=0.53. After a thermally sterilized product was stored at room temperature for three months, it was confirmed that neither dryness nor leak of the hollow fiber membrane occurred. In addition, the module water permeability retention rate was 101%, which was a good result. No viable bacteria were found. A rinse test was conducted after installation to a filtration apparatus, and the TOC on the filtrated water side reached below 500 ppb with the use of only 14 L/m$^2$ of pure water per membrane area. For a hollow fiber membrane module stored in an environment of temperature cycle of 20° C. to 50° C., it was confirmed that no dryness of the hollow fiber membranes occurred after completion of any of 10, 40, or 70 cycles. In addition, after the membrane module was subjected to vibration after thermal sterilization was completed, a leak test was conducted. It was confirmed that no leakage occurred and that the hollow fiber membrane was not damaged.

Example 13

Hollow fiber membrane modules the same as hollow fiber membrane modules in Example 11 were used. The differences were as follows: the pure water content ratio in the first space of the hollow fiber membrane module was set to $W_{first}/V_{first}$=0.88 and the pure water content ratio in the second space was set to $W_{second}/V_{second}$=0.95. After a thermally sterilized product was stored at room temperature for three months, it was confirmed that neither dryness nor leak of the hollow fiber membrane occurred. In addition, the module water permeability retention rate was 99%, which was a good result. No viable bacteria were found. A rinse test was conducted after installation to a filtration apparatus, and the TOC on the filtrated water side reached below 500 ppb with the use of only 13 L/$m^2$ of pure water per membrane area. For a hollow fiber membrane module stored in an environment of temperature cycle of 20° C. to 50° C., it was confirmed that no dryness of the hollow fiber membranes occurred after completion of any of 10, 40, or 70 cycles. In addition, after the membrane module was subjected to vibration after thermal sterilization was completed, a leak test was conducted. It was confirmed that no leakage occurred and that the hollow fiber membrane was not damaged.

Example 14

Hollow fiber membrane modules the same as hollow fiber membrane modules in Example 11 were used. The differences were as follows: the pure water content ratio in the first space of the hollow fiber membrane module was set to $W_{first}/V_{first}$=0.97 and the pure water content ratio in the second space was set to $W_{second}/V_{second}$=0.07. After a thermally sterilized product was stored at room temperature for three months, it was confirmed that neither dryness nor leak of the hollow fiber membrane occurred. In addition, the module water permeability retention rate was 97%, which was a good result. No viable bacteria were found. A rinse test was conducted after installation to a filtration apparatus, and the TOC on the filtrated water side reached below 500 ppb with the use of only 17 L/$m^2$ of pure water per membrane area. For a hollow fiber membrane module stored in an environment of temperature cycle of 20° C. to 50° C., no leaks were observed when leak inspection was conducted after completion of 10 cycles. However, when leak inspections were conducted after and 70 cycles were completed, it was confirmed that the hollow fiber membranes had dryness. In addition, after the membrane module was subjected to vibration after thermal sterilization was completed, a leak test was conducted. It was confirmed that no leakage occurred and that the hollow fiber membrane was not damaged.

Comparative Example 4

Hollow fiber membrane modules the same as hollow fiber membrane modules in Example 11 were used. The differences were as follows: the pure water content ratio in the first space of the hollow fiber membrane module was set to $W_{first}/V_{first}$=0.07 and the pure water content ratio in the second space was set to $W_{second}/V_{second}$=0.06. After a thermally sterilized product was stored at room temperature for three months, the hollow fiber membranes were confirmed to have dryness. In addition, the module water permeability retention ratio was 90%, which was lower than that before the thermal sterilization by 10%. Viable bacteria were found. A rinse test was conducted after installation to a filtration apparatus, and the TOC on the filtrated water side reached below 500 ppb with the use of only 18 L/$m^2$ of pure water per membrane area. For a hollow fiber membrane module stored in an environment of temperature cycle of 20° C. to 50° C., a leak test was carried out after 10, 40, and 70 cycles were completed, and the hollow fiber membranes were confirmed to have dryness in the all tests.

Comparative Example 5

Hollow fiber membrane modules the same as hollow fiber membrane modules in Example 11 were used. The difference was as follows: the storage liquid for the hollow fiber membrane module was changed from pure water to a 65 wt % glycerin solution. The content ratio of the glycerin solution in the first space of the hollow fiber membrane module was set to $W_{first}/V_{first}$=0.05, and the content ratio of the glycerin solution in the second space was set to $W_{second}/V_{second}$=0.04. After a thermally sterilized product was stored at room temperature for three months, the module water permeability retention ratio was 101%, which was within a good range. No viable organisms were observed. A rinse test was conducted after installation to a filtration apparatus, and 200 L/$m^2$ of pure water per membrane area was required before the TOC on the filtrated water side fell below 500 ppb.

Example 15

Hollow fiber membrane modules having the same configuration as in Example 1 were used for the tests. The differences were as follows: the pure water content ratio in the first space of the hollow fiber membrane module was set to $W_{first}/V_{first}$=0.12, the pure water content ratio in the second space was set to $W_{second}/V_{second}$=0.18, and aseptic connectors were used. Aseptic connectors (AQS33012HT) manufactured by CPC were used as aseptic connectors. In addition, the hollow fiber membrane modules in Example 15 were packed in sterile bags (product name: cleanpeak Easy-Tear Bag) prior to thermal treatment. One side of the sterile bag was made of a non-woven fabric (Tybek 1073b) with excellent water vapor permeability, and the opposite side was made of a high-density polyethylene film. The module was placed in the thermal treatment apparatus so that the high-density polyethylene film was placed in a portion sandwiched between the hollow fiber membrane module and the floor of the thermal treatment apparatus and the nonwoven fabric surface was placed above the hollow fiber membrane module. This was done to prevent excessive compressive force on the nonwoven fabric surface and prevent collapse of the pores in the nonwoven fabric. Steam sterilization treatment at 125° C. was then performed. The treated product was stored at room temperature for three months and it was confirmed that neither dryness nor leak of the hollow fiber membrane occurred In addition, the module water permeability retention rate was 98%, which was a good result. No viable bacteria were found. A rinse test was conducted after installation to a filtration apparatus, and the TOC on the filtrated water side reached below 500 ppb with the use of only 17 L/$m^2$ of pure water per membrane area. For a hollow fiber membrane module stored in an environment of temperature cycle of 20° C. to 50° C., it was confirmed that no dryness of the hollow fiber membranes occurred after completion of any of 10, 40, or 70 cycles. In addition, after the membrane module was subjected to vibration after thermal sterilization was completed, a leak test was conducted. It was confirmed that no leakage occurred and that the hollow fiber membrane was not damaged. In addition, a cool and heat cycle test was conducted on a hollow fiber membrane module after the thermal sterilization had been completed. In Example 15, hollow fiber membrane modules having a configuration in which the fixation portions and flow guide cylinders were separated were also used. After 500 cycles were completed, a leak test was performed and no leakage was observed.

TABLE 1

| Item | Unit | Comp. Ex.1 | Comp. Ex.2 | Example 1 | Example 2 | Example 3 |
|---|---|---|---|---|---|---|
| Material of film | — | PVDF | PVDF | PVDF | PVDF | PVDF |
| MF or UF | — | MF | MF | MF | MF | MF |
| Inner diameter | mm | 1.4 | 1.4 | 1.4 | 1.4 | 1.4 |
| Outer diameter | mm | 2.2 | 2.2 | 2.2 | 2.2 | 2.2 |
| Number of membranes | | 2050 | 2050 | 2050 | 2050 | 2050 |
| Material of housing | — | Polysulfone | Polysulfone | Polysulfone | Polysulfone | Polysulfone |
| Inner diameter of pipe | mm | 130 | 130 | 130 | 130 | 130 |
| Sum of cross-sectional area of outer diameter of fiber | $mm^2$ | 7793 | 7793 | 7793 | 7793 | 7793 |
| Sum of cross-sectional area of inner diameter of pipe | $mm^2$ | 13273 | 13273 | 13273 | 13273 | 13273 |
| Sum of cross-sectional area of outer diameter/sum of cross-sectional area of inner diameter of pipe * 100 | % | 58.7 | 58.7 | 58.7 | 58.7 | 58.7 |
| Nozzle/cap sealing member | — | Blind cap | Blind cap | Blind cap | Blind cap | Blind cap |
| Linear expansion coefficient ratio of module case/blind plate | | 1 | 1 | 1 | 1 | 1 |
| Sterile bag | — | Absent | Absent | Absent | Absent | Absent |
| Heating method | — | Heating in dryer | No heating | Heating in dryer | Heating in dryer | Heating in dryer |
| Mo arrangement when heated | | Placed horizontally | Placed horizontally | Placed horizontally | Placed horizontally | Placed horizontally |
| $V_{first}$ | L | 4.22 | 4.22 | 4.22 | 4.22 | 4.22 |
| $V_{second}$ | L | 4.91 | 4.91 | 4.91 | 4.91 | 4.91 |
| $V_{pore}$ | L | 3.61 | 3.61 | 3.61 | 3.61 | 3.61 |
| $V_{all}$ | L | 12.74 | 12.74 | 12.74 | 12.74 | 12.74 |
| $W_{first}$ | L | 0.30 | 0.55 | 0.55 | 0.20 | 0.30 |
| $W_{second}$ | L | 0.40 | 0.65 | 0.65 | 3.98 | 4.42 |
| $W_{pore}$ | L | 3.10 | 3.61 | 3.30 | 3.57 | 3.54 |
| $W_{all}$ | L | 3.80 | 4.81 | 4.50 | 7.75 | 8.26 |
| $W_{first}/V_{first}$ | | 0.07 | 0.13 | 0.13 | 0.05 | 0.07 |
| $W_{second}/V_{second}$ | | 0.08 | 0.13 | 0.13 | 0.81 | 0.90 |
| $W_{all}/V_{all}$ | — | 0.30 | 0.38 | 0.35 | 0.61 | 0.65 |
| $W_{pore}/V_{pore}$ | — | 0.86 | 1.00 | 0.91 | 0.99 | 0.98 |
| $W_{first}/V_{first} < W_{second}/V_{second}$ | | Y | Y | Y | Y | Y |
| $0.8 \leq W_{second}/V_{second} \leq 1$ | | N | N | N | Y | Y |
| Space between flow guide cylinder and potting portion | | Present | Present | Present | Present | Absent |
| Temperature reached during heating | ° C. | 90 | — | 90 | 90 | 85 |
| Minimum relative humidity during temperature rise | rt % | 67 | — | 81 | 86 | 87 |
| Internal pressure of module when set temperature is reached | kPa | 100 | — | 100 | 105 | 90 |
| TOC | ppm | 46 | 46 | 46 | 42 | 38 |
| Presence or absence of dryness of film upon 3 month storage at room temperature after heat sterilization treatment | — | Present | Absent | Absent | Absent | Absent |
| Presence or absence of leakage of membrane upon 3 month storage at room temperature after heat sterilization treatment | — | Absent | Absent | Absent | Absent | Absent |
| Water permeation retention ratio upon 3-month storage at room temperature after heat sterilization | % | 98 | 99 | 99 | 101 | 100 |
| Presence or absence of growth of bacteria upon 3 month storage at room temperature after heat sterilization treatment | — | Absent | Present | Absent | Absent | Absent |
| Presence or absence of dryness of film after thermal cycle storage at 20° C. to 50° C. of 10 cycles | — | Present | Absent | Absent | Absent | Absent |
| Presence or absence of dryness of film after thermal cycle storage at 20° C. to 50° C. of 40 cycles | — | Present | Present | Present | Absent | Absent |
| Presence or absence of dryness of film after thermal cycle storage at 20° C. to 50° C. of 70 cycles | — | Present | Present | Present | Absent | Absent |
| Presence of membrane-derived leakage after vibration load test | — | Absent | Absent | Absent | Absent | Absent |
| Leakage after cool-heat cycle test at 20° C.-75° C. | — | Absent | Absent | Absent | Absent | Absent |

TABLE 2

| Item | Unit | Example 4 | Example 5 | Example 6 | Comp. Ex.3 | Example 7 |
|---|---|---|---|---|---|---|
| Material of film | — | PVDF | PVDF | PVDF | PVDF | PVDF |
| MF or UF | — | MF | MF | MF | MF | MF |
| Inner diameter | mm | 1.4 | 1.4 | 1.4 | 1.4 | 1.4 |
| Outer diameter | mm | 2.2 | 2.2 | 2.2 | 2.2 | 2.2 |
| Number of membranes | | 2050 | 2050 | 2050 | 2050 | 2050 |
| Material of housing | — | Polysulfone | Polysulfone | Polysulfone | Polysulfone | Polysulfone |
| Inner diameter of pipe | mm | 130 | 130 | 130 | 130 | 130 |
| Sum of cross-sectional area of outer diameter of fiber | $mm^2$ | 7793 | 7793 | 7793 | 7793 | 7793 |
| Sum of cross-sectional area of inner diameter of pipe | $mm^2$ | 13273 | 13273 | 13273 | 13273 | 13273 |

TABLE 2-continued

| Item | Unit | Example 4 | Example 5 | Example 6 | Comp. Ex.3 | Example 7 |
|---|---|---|---|---|---|---|
| Sum of cross-sectional area of outer diameter/sum of cross-sectional area of inner diameter of pipe * 100 | % | 58.7 | 58.7 | 58.7 | 58.7 | 58.7 |
| Nozzle/cap sealing member | — | Blind cap | Blind cap | Blind cap | Blind cap | Blind cap |
| Linear expansion coefficient ratio of module case/blind plate | | 1 | 1 | 1 | 1 | 1 |
| Sterile bag | — | Absent | Absent | Absent | Absent | Present |
| Heating method | — | Heating in dryer | Heating in dryer | Heating in dryer | Heating in dryer | Heating in dryer |
| Mo arrangement when heated | | Placed horizontally | Placed horizontally | Placed horizontally | Placed horizontally | Placed horizontally |
| $V_{first}$ | L | 4.22 | 4.22 | 4.22 | 4.22 | 4.22 |
| $V_{second}$ | L | 4.91 | 4.91 | 4.91 | 4.91 | 4.91 |
| $V_{pore}$ | L | 3.61 | 3.61 | 3.61 | 3.61 | 3.61 |
| $V_{all}$ | L | 12.74 | 12.74 | 12.74 | 12.74 | 12.74 |
| $W_{first}$ | L | 1.20 | 2.74 | 3.90 | 4.22 | 2.00 |
| $W_{second}$ | L | 4.81 | 4.71 | 4.65 | 4.91 | 2.60 |
| $W_{pore}$ | L | 3.61 | 3.61 | 3.61 | 3.61 | 3.52 |
| $W_{all}$ | L | 9.62 | 11.07 | 12.16 | 12.74 | 8.12 |
| $W_{first}/V_{first}$ | | 0.28 | 0.65 | 0.92 | 1.00 | 0.47 |
| $W_{second}/V_{second}$ | | 0.98 | 0.96 | 0.95 | 1.00 | 0.53 |
| $W_{all}/V_{all}$ | — | 0.76 | 0.87 | 0.95 | 1.00 | 0.64 |
| $W_{pore}/V_{pore}$ | — | 1.00 | 1.00 | 1.00 | 1.00 | 0.98 |
| $W_{first}/V_{first} < W_{second}/V_{second}$ | | Y | Y | Y | Y | Y |
| $0.8 \leq W_{second}/V_{second} \leq 1$ | | Y | Y | Y | Y | N |
| Space between flow guide cylinder and potting portion | | Present | Present | Present | Present | Present |
| Temperature reached during heating | ° C. | 90 | 90 | 90 | 90 | 90 |
| Minimum relative humidity during temperature rise | rt % | 92 | 92 | 97 | 90 | 84 |
| Internal pressure of module when set temperature is reached | kPa | 110 | 113 | 200 | 560 | 105 |
| TOC | ppm | 28 | 22 | 22 | 18 | 22 |
| Presence or absence of dryness of film upon 3 month storage at room temperature after heat sterilization treatment | — | Absent | Absent | Absent | Absent | Absent |
| Presence or absence of leakage of membrane upon 3 month storage at room temperature after heat sterilization treatment | — | Absent | Absent | Absent | Absent | Absent |
| Water permeation retention ratio upon 3-month storage at room temperature after heat sterilization | % | 103 | 99 | 99 | 102 | 97 |
| Presence or absence of growth of bacteria upon 3 month storage at room temperature after heat sterilization treatment | — | Absent | Absent | Absent | Absent | Absent |
| Presence or absence of dryness of film after thermal cycle storage at 20° C. to 50° C. of 10 cycles | — | Absent | Absent | Absent | Absent | Absent |
| Presence or absence of dryness of film after thermal cycle storage at 20° C. to 50° C. of 40 cycles | — | Absent | Absent | Absent | Absent | Absent |
| Presence or absence of dryness of film after thermal cycle storage at 20° C. to 50° C. of 70 cycles | — | Absent | Absent | Absent | Absent | Absent |
| Presence of membrane-derived leakage after vibration load test | — | Absent | Absent | Absent | Absent | Present |
| Leakage after cool-heat cycle test at 20° C.-75° C. | — | Absent | Absent | Absent | Absent | Absent |

TABLE 3

| Item | Unit | Example 8 | Example 9 | Example 10 | Example 11 | Example 12 |
|---|---|---|---|---|---|---|
| Material of film | — | PVDF | PVDF | PVDF | PSf | PSf |
| MF or UF | — | MF | MF | MF | UF | UF |
| Inner diameter | mm | 1.4 | 1.4 | 1.4 | 0.6 | 0.6 |
| Outer diameter | mm | 2.2 | 2.2 | 2.2 | 1 | 1 |
| Number of membranes | | 2050 | 2050 | 2050 | 11600 | 11600 |
| Material of housing | — | Polysulfone | Polysulfone | Polysulfone | Polysulfone | Polysulfone |
| Inner diameter of pipe | mm | 130 | 130 | 130 | 154 | 154 |
| Sum of cross-sectional area of outer diameter of fiber | $mm^2$ | 7793 | 7793 | 7793 | 9111 | 9111 |
| Sum of cross-sectional area of inner diameter of pipe | $mm^2$ | 13273 | 13273 | 13273 | 18627 | 18627 |
| Sum of cross-sectional area of outer diameter/sum of cross-sectional area of inner diameter of pipe * 100 | % | 58.7 | 58.7 | 58.7 | 48.9 | 48.9 |
| Nozzle/cap sealing member | — | Blind cap | Blind cap | Blind cap | Blind cap | Blind cap |
| Linear expansion coefficient ratio of module case/blind plate | | 1 | 1 | 1 | 1 | 1 |
| Sterile bag | — | Present | Absent | Absent | Absent | Absent |
| Heating method | — | Heating in dryer | Heating in dryer | Heating in dryer | Heating in dryer | Heating in dryer |
| Mo arrangement when heated | | Placed horizontally | Placed horizontally | Placed horizontally | Placed horizontally | Placed horizontally |

TABLE 3-continued

| Item | Unit | Example 8 | Example 9 | Example 10 | Example 11 | Example 12 |
|---|---|---|---|---|---|---|
| $V_{first}$ | L | 4.22 | 4.22 | 4.22 | 4.43 | 4.43 |
| $V_{second}$ | L | 4.91 | 4.91 | 4.91 | 9.05 | 9.05 |
| $V_{pore}$ | L | 3.61 | 3.61 | 3.61 | 4.87 | 4.87 |
| $V_{all}$ | L | 12.74 | 12.74 | 12.74 | 18.35 | 18.35 |
| $W_{first}$ | L | 1.20 | 4.15 | 4.15 | 0.30 | 2.34 |
| $W_{second}$ | L | 1.50 | 0.40 | 2.40 | 8.95 | 8.90 |
| $W_{pore}$ | L | 3.45 | 3.40 | 3.50 | 4.87 | 4.87 |
| $W_{all}$ | L | 6.15 | 7.95 | 10.05 | 14.12 | 16.11 |
| $W_{first}/V_{first}$ | | 0.28 | 0.98 | 0.98 | 0.07 | 0.53 |
| $W_{second}/V_{second}$ | | 0.31 | 0.08 | 0.49 | 0.99 | 0.98 |
| $W_{all}/V_{all}$ | — | 0.48 | 0.62 | 0.79 | 0.77 | 0.88 |
| $W_{pore}/V_{pore}$ | — | 0.96 | 0.94 | 0.97 | 1.00 | 1.00 |
| $W_{first}/V_{first} < W_{second}/V_{second}$ | | Y | N | N | Y | Y |
| $0.8 \leq W_{second}/V_{second} \leq 1$ | | N | N | N | Y | Y |
| Space between flow guide cylinder and potting portion | | Present | Present | Present | Absent | Absent |
| Temperature reached during heating | ° C. | 90 | 90 | 90 | 90 | 90 |
| Minimum relative humidity during temperature rise | rt % | 82 | 75 | 80 | | |
| Internal pressure of module when set temperature is reached | kPa | 103 | 105 | 112 | | |
| TOC | ppm | 22 | 22 | 22 | 46 | 46 |
| Presence or absence of dryness of film upon 3 month storage at room temperature after heat sterilization treatment | — | Absent | Absent | Absent | Absent | Absent |
| Presence or absence of leakage of membrane upon 3 month storage at room temperature after heat sterilization treatment | — | Absent | Absent | Absent | Absent | Absent |
| Water permeation retention ratio upon 3-month storage at room temperature after heat sterilization | % | 99 | 98 | 100 | 102 | 101 |
| Presence or absence of growth of bacteria upon 3 month storage at room temperature after heat sterilization treatment | — | Absent | Absent | Absent | Absent | Absent |
| Presence or absence of dryness of film after thermal cycle storage at 20° C. to 50° C. of 10 cycles | — | Absent | Absent | Absent | Absent | Absent |
| Presence or absence of dryness of film after thermal cycle storage at 20° C. to 50° C. of 40 cycles | — | Absent | Present | Absent | Absent | Absent |
| Presence or absence of dryness of film after thermal cycle storage at 20° C. to 50° C. of 70 cycles | — | Absent | Present | Absent | Absent | Absent |
| Presence of membrane-derived leakage after vibration load test | — | Absent | Absent | Present | Absent | Absent |
| Leakage after cool-heat cycle test at 20° C.-75° C. | — | Absent | Absent | Absent | Present | — |

TABLE 4

| Item | Unit | Example 13 | Example 14 | Comp. Ex.4 | Comp. Ex.5 | Example 15 |
|---|---|---|---|---|---|---|
| Material of film | — | PSf | PSf | PSf | PSf | PVDF |
| MF or UF | — | UF | UF | UF | UF | MF |
| Inner diameter | mm | 0.6 | 0.6 | 0.6 | 0.6 | 1.4 |
| Outer diameter | mm | 1 | 1 | 1 | 1 | 2.2 |
| Number of membranes | | 11600 | 11600 | 11600 | 11600 | 2050 |
| Material of housing | — | Polysulfone | Poly sulfone | Polysulfone | Polysulfone | Polysulfone |
| Inner diameter of pipe | mm | 154 | 154 | 154 | 154 | 130 |
| Sum of cross-sectional area of outer diameter of fiber | $mm^2$ | 9111 | 9111 | 9111 | 9111 | 7793 |
| Sum of cross-sectional area of inner diameter of pipe | $mm^2$ | 18627 | 18627 | 18627 | 18627 | 13273 |
| Sum of cross-sectional area of outer diameter/sum of cross-sectional area of inner diameter of pipe * 100 | % | 48.9 | 48.9 | 48.9 | 48.9 | 58.7 |
| Nozzle/cap sealing member | — | Blind cap | Blind cap | Blind cap | Blind cap | Sterile connector |
| Linear expansion coefficient ratio of module case/blind plate | | 1 | 1 | 1 | 1 | — |
| Sterile bag | — | Absent | Absent | Absent | Absent | Present |
| Heating method | — | Heating in dryer | Heating in dryer | Heating in dryer | No heating | Autoclave |
| Mo arrangement when heated | | Placed horizontally | Placed horizontally | Placed horizontally | 0 | Placed horizontally |
| $V_{first}$ | L | 4.43 | 4.43 | 4.43 | 4.43 | 4.22 |
| $V_{second}$ | L | 9.05 | 9.05 | 9.05 | 9.05 | 4.91 |
| $V_{pore}$ | L | 4.87 | 4.87 | 4.87 | 4.87 | 3.61 |
| $V_{all}$ | L | 18.35 | 18.35 | 18.35 | 18.35 | 12.74 |
| $W_{first}$ | L | 3.90 | 4.30 | 0.30 | 0.20 | 0.50 |
| $W_{second}$ | L | 8.60 | 0.60 | 0.50 | 0.35 | 0.90 |
| $W_{pore}$ | L | 4.87 | 4.65 | 4.10 | 4.83 | 3.57 |
| $W_{all}$ | L | 17.37 | 9.55 | 4.90 | 5.38 | 4.97 |

TABLE 4-continued

| Item | Unit | Example 13 | Example 14 | Comp. Ex.4 | Comp. Ex.5 | Example 15 |
|---|---|---|---|---|---|---|
| $W_{first}/V_{first}$ | | 0.88 | 0.97 | 0.07 | 0.05 | 0.12 |
| $W_{second}/V_{second}$ | | 0.95 | 0.07 | 0.06 | 0.04 | 0.18 |
| $W_{all}/V_{all}$ | — | 0.95 | 0.52 | 0.27 | 0.29 | 0.39 |
| $W_{pore}/V_{pore}$ | — | 1.00 | 0.95 | 0.84 | 0.99 | 0.99 |
| $W_{first}/V_{first} < W_{second}/V_{second}$ | | Y | N | N | N | Y |
| $0.8 \le W_{second}/V_{second} \le 1$ | | Y | N | N | N | N |
| Space between flow guide cylinder and potting portion | | Absent | Absent | Absent | Absent | Honn |
| Temperature reached during heating | ° C. | 90 | 90 | 90 | 90 | 125 |
| Minimum relative humidity during temperature rise | rt % | | | | | 92 |
| Internal pressure of module when set temperature is reached | kPa | | | | | — |
| TOC | ppm | 46 | 46 | 46 | 20000 | 46 |
| Presence or absence of dryness of film upon 3 month storage at room temperature after heat sterilization treatment | — | Absent | Absent | Present | Absent | Absent |
| Presence or absence of leakage of membrane upon 3 month storage at room temperature after heat sterilization treatment | — | Absent | Absent | Absent | Absent | Absent |
| Water permeation retention ratio upon 3-month storage at room temperature after heat sterilization | % | 99 | 97 | 90 | 101 | 98 |
| Presence or absence of growth of bacteria upon 3 month storage at room temperature after heat sterilization treatment | — | Absent | Absent | Present | Absent | Absent |
| Presence or absence of dryness of film after thermal cycle storage at 20° C. to 50° C. of 10 cycles | — | Absent | Absent | Present | Absent | Absent |
| Presence or absence of dryness of film after thermal cycle storage at 20° C. to 50° C. of 40 cycles | — | Absent | Present | Present | Absent | Absent |
| Presence or absence of dryness of film after thermal cycle storage at 20° C. to 50° C. of 70 cycles | — | Absent | Present | Present | Absent | Absent |
| Presence of membrane-derived leakage after vibration load test | — | Absent | Absent | Absent | Absent | Absent |
| Leakage after cool-heat cycle test at 20° C.-75° C. | — | — | — | — | — | Absent |

REFERENCE SIGNS LIST

1 Hollow fiber membrane module
3 Hollow fiber membrane bundle
3*a* Hollow fiber membrane
5 Module case
5*a* Upper nozzle
5*b* Lower nozzle
10, 11 Cap
10*a*,11*a* Conduit
12 O-ring
13 Nut
14 Fixation portion
15,16,17,18 Blind cap
19*a*,19*b* Flow guide cylinder
20 Aseptic connector
21 Sterile filter
22 Second portion
23 Wrapping film
24 First portion
25 Stationary portion
100 Filtration apparatus
101 First filtrated water collection pipe
102 Second filtrated water collection pipe
101*a* First valve
102*a* Second valve
104 Feed piping
105 Circulation piping
106 Treatment water tank
sp1 First space
sp2 Second space
sp3 Third space
YY First blind cap
ZZ Second blind cap

The invention claimed is:

1. A hollow fiber membrane module comprising:

a hollow fiber membrane accommodated in a module case, the hollow fiber being a plurality of hollow fiber membranes bundled together and both end faces of the hollow fiber membrane bundle being integrated with the module case by a potting material;

a pair of fixation portions made of the potting material that seals space between outer surfaces of the hollow fiber membranes and between the outer surfaces and an inner surface of the module case at both ends of the hollow fiber membrane bundle inside the module case; and a pair of flow guide cylinders that are provided closer to a longitudinal center side of the module case than the pair of fixation portions, and are disposed so as to surround respective ends of the hollow fiber membrane bundle, wherein a storage liquid is contained in 90% or more of pores of the hollow fiber membrane bundle, the storage liquid being water free of viable bacteria, a space portion inside the module case is filled with a gas free of viable bacteria and the storage liquid, and a separation distance between respective ends of the flow guide cylinders located on fixation portion sides and the fixation portions is 1 mm or more and 20 mm or less.

2. The hollow fiber membrane module according to claim 1, wherein when a piping connection port present in the module case is sealed by a sealing member, the following expression (1) is satisfied:

$$0.35 \le W_{all}/V_{all} \le 0.95 \quad (1)$$

where $V_{first}$ is a volume of a first space surrounded by an inner surface of a cap attached to the module case, an end face of the potting material, and inner surfaces and end faces at both ends of the hollow fiber membranes, $V_{second}$ is a volume of a second space surrounded by an inner surface of the module case, the end face of the potting material, and outer surfaces of the hollow fiber membranes, $V_{pore}$ is a volume of a third space formed by the pores of the hollow fiber membranes, $V_{all}$ is a total volume of $V_{first}$, $V_{second}$, and $V_{pore}$, $W_{first}$ is a volume of the storage liquid present in the first space, $W_{second}$ is a volume of the storage liquid present in the second space, $W_{pore}$ is a total volume of the storage liquid present in the third space, and $W_{all}$ is a total volume of $W_{first}$, $W_{second}$, and $W_{pore}$.

3. The hollow fiber membrane module according to claim 1, wherein when a piping connection port present in the module case is sealed by a sealing member, a ratio of $W_{first}$ to $V_{first}$ is equal to or less than a ratio of $W_{second}$ to $V_{second}$, where $V_{first}$ is a volume of a first space surrounded by an inner surface of a cap attached to the module case, an end face of the potting material, and inner surfaces and end faces at both ends of the hollow fiber membranes, $V_{second}$ is a volume of a second space surrounded by an inner surface of the module case, the end face of the potting material, and outer surfaces of the hollow fiber membranes, $W_{first}$ is a volume of the storage liquid present in the first space, and $W_{second}$ is a volume of the storage liquid present in the second space.

4. The hollow fiber membrane module according to claim 1, wherein when a piping connection port present in the module case is sealed by a sealing member, the ratio of $W_{second}$ to $V_{second}$ is 0.8 or more and 1 or less, where $V_{second}$ is a volume of a second space surrounded by an inner surface of the module case, the end face of the potting material, and outer surfaces of the hollow fiber membranes, and $W_{second}$ is a volume of the storage liquid present in the second space.

5. The hollow fiber membrane module according to claim 1, wherein total organic carbon (TOC) in the storage liquid contained in the module case is 1 ppm or more and 50 ppm or less.

6. The hollow fiber membrane module according to claim 1, wherein all piping connection ports provided to the module case are sealed by blind caps, a linear expansion coefficient of a material used for the blind caps is between 0.95 and 1.05 times a linear expansion coefficient of the module case.

7. The hollow fiber membrane module according to claim 1, wrapped by a wrapping film having a first portion, at least part of which has gas permeability.

8. The hollow fiber membrane module according to claim 7, wherein the module case is cylindrical, and at least a part of the piping connection port provided to the module case protrudes in a direction perpendicular to a longitudinal direction of the module case, the hollow fiber membrane module is wrapped by the wrapping film so that a second portion of the wrapping film, which has a smaller gas permeability than the first portion, is positioned within a range of 120° centered around a direction rotated by 90° relative to a direction of protrusion of the port or within a range of 60° centered around an opposite direction of the direction of protrusion, in a radial direction of an axis of the module case.

9. The hollow fiber membrane module according to claim 1, wherein an aseptic connector is attached to the piping connection port provided to the module case, the aseptic connector comprises a sterile filter, and one end face of the sterile filter is in direct contact with a space inside the hollow fiber membrane module.

10. A manufacturing method of the hollow fiber membrane module according to claim 1, comprising:

inserting a hollow fiber membrane into a module case, the hollow fiber being a plurality of hollow fiber membranes bundled together, integrating both end faces of the hollow fiber membrane bundle with the module case by a potting material, wherein a storage liquid is filled in 90% or more of pores of the hollow fiber membrane bundle, the storage liquid being water free of viable bacteria, a space portion inside the module case is filled with a gas free of viable bacteria and the storage liquid, the method comprising:

when a connection piping portion present in the module case is sealed by a blind cap, adjusting $W_{all}$ inside the hollow fiber membrane module so that the following expression (1) is satisfied: $0.35 \leq W_{all}/V_{all} \leq 0.95$ . . . (1), where $V_{first}$ is a volume of a first space surrounded by an inner surface of a cap attached to the module case, an end face of the potting material, and inner surfaces and end faces at both ends of the hollow fiber membranes, $V_{second}$ is a volume of a second space surrounded by an inner surface of a pipe portion of the module case, the end face of the potting material, and outer surfaces of the hollow fiber membranes, $V_{pore}$ is a volume of a third space formed by the pores of the hollow fiber membranes, $V_{all}$ is a total volume of $V_{first}$, $V_{second}$, and $V_{pore}$, $W_{first}$ is a volume of water present in the first space, $W_{second}$ is a volume of water present in the second space, $W_{pore}$ is a total volume of water present in the third space, and $W_{all}$ is a total volume of $W_{first}$, $W_{second}$, and $W_{pore}$, transition the hollow fiber membrane module to a state where no viable bacteria are present in water and a gas by thermally treating at 80° C. to 125° C. while a piping connection port is sealed.

11. The hollow fiber membrane module according to claim 10, wherein a relative humidity inside the module case is maintained to 85% or higher in the step of thermally treating the hollow fiber membrane module in which the pure water and the gas are sealed.

12. The manufacturing method of a hollow fiber membrane module according to claim 10, comprising heating an outside of the hollow fiber membrane module by dry air in the step of thermally treating the hollow fiber membrane module in which the pure water and the gas are sealed.

13. The manufacturing method of a hollow fiber membrane module according to claim 10, wherein in the hollow fiber membrane module in which an aseptic connector is attached to the piping connection port provided to the module case, a pressure difference between a pressure inside the module case and a pressure outside the module case at 20° C. before start of the thermal treatment is 0 kPa, and the pressure difference between the pressure inside the module case and the pressure outside the module case separated by a sterile filter of the aseptic connector during the thermal treatment is 20 kPa or less.

14. The manufacturing method of a hollow fiber membrane module according to claim 10, wherein in the step of thermally treating the module case having the water and the gas sealed therein, the thermal treatment is carried out while the piping connection port in the module case is sealed by a blind cap.

15. The manufacturing method of a hollow fiber membrane module according to claim 10, wherein the thermal treatment is carried out while the hollow fiber membrane module is wrapped by a wrapping film having a first portion, at least part of which has gas permeability.

16. The manufacturing method of a hollow fiber membrane module according to claim 15, wherein the module case is cylindrical, and at least a part of the piping connection port provided to the module case protrudes in a direction perpendicular to a longitudinal direction of the module case, in the step of thermally treating the hollow fiber membrane module having the water and the gas sealed therein, the hollow fiber membrane module is wrapped by the wrapping film so that a second portion of the wrapping film, which has a smaller gas permeability than the first portion, is positioned within a range of 120° centered around a direction rotated by 90° relative to a direction of protrusion of the port or within a range of 60° centered around an opposite direction of the direction of protrusion, in a radial direction of an axis of the module case.

17. A cleaning method of a hollow fiber membrane module, wherein when an inside of a hollow fiber membrane module manufactured by the manufacturing method according to claim 10 is cleaned by filtration cleaning, the TOC of filtrated water becomes 500 ppb or less by filtrating pure water at 20 $L/m^2$ or less per membrane area of the hollow fiber membranes.

* * * * *